United States Patent
Matsushita

(10) Patent No.: US 11,602,694 B2
(45) Date of Patent: Mar. 14, 2023

(54) INFORMATION PROCESSING SYSTEM, INFORMATION PROCESSING APPARATUS, STORAGE MEDIUM, AND INFORMATION PROCESSING METHOD

(71) Applicant: NINTENDO CO., LTD., Kyoto (JP)

(72) Inventor: Shingo Matsushita, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/509,545

(22) Filed: Oct. 25, 2021

(65) Prior Publication Data

US 2022/0168651 A1    Jun. 2, 2022

(30) Foreign Application Priority Data

Nov. 30, 2020   (JP) .............................. JP2020-198153

(51) Int. Cl.
*A63F 13/69*   (2014.01)
*A63F 13/67*   (2014.01)

(52) U.S. Cl.
CPC .............. *A63F 13/69* (2014.09); *A63F 13/67* (2014.09); *A63F 2300/609* (2013.01)

(58) Field of Classification Search
CPC ..... A63F 13/69; A63F 13/67; A63F 2300/609
See application file for complete search history.

(56) References Cited

PUBLICATIONS

RPG Site, "Genshin Impact Gacha System: wish gacha draws, rates, banners, pity and more explained," Oct. 7, 2020, https://www.rpgsite.net/feature/10312-genshin-impact-gacha-system-wish-gacha-draws-rates-banners-pity-and-more-explained (Year: 2020).*
"Learn How Summoning Works", [online], Nintendo Co., Ltd., [searched on Nov. 15, 2020], internet: https://new-guide.fire-emblem-heroes.com/en-US/feh-2020.html , 6 pages.

\* cited by examiner

*Primary Examiner* — Kevin Y Kim
(74) *Attorney, Agent, or Firm* — Nixon & Vanderhye P.C.

(57) ABSTRACT

An example of an information processing system executes a draw for choosing one or more game character based on selection probabilities from among a group of game characters, wherein at least one of the game characters chosen by a draw is granted to the user. When a game character of a first group is granted by a draw, a first selection probability value for game characters of the first group is changed to a first base value, and a second selection probability value for game characters of a second group is changed to the second base value. When a game character of the second group is granted by a draw and a boost value of the first selection probability is greater than a predetermined value, the first selection probability value is at least lowered so that the first selection probability value is greater than the first base value.

12 Claims, 11 Drawing Sheets

INFORMATION PROCESSING SYSTEM, INFORMATION PROCESSING APPARATUS, STORAGE MEDIUM, AND INFORMATION PROCESSING METHOD

CROSS REFERENCE TO RELATED APPLICATION

This application claims priority to Japanese Patent Application No. 2020-198153, filed on Nov. 30, 2020, the entire contents of which are incorporated herein by reference.

FIELD

The present disclosure relates to an information processing system, an information processing apparatus, a storage medium and an information processing method, wherein a game character is granted to the user by a draw.

BACKGROUND AND SUMMARY

Conventionally, a game character is granted to the user by a draw.

Regarding a draw for granting a game character to the user as described above, it is preferred to improve the playability.

Therefore, the present application discloses an information processing system, an information processing apparatus, a storage medium and an information processing method, with which it is possible to improve the playability of a draw for granting a game character.

(1) An example of an information processing system comprises a processor and a memory coupled thereto. The processor is configured to control the information processing system to at least: execute, in response to an instruction from a user, a draw for choosing one or more game characters based on selection probabilities from among groups of game characters, the groups including a first group including one or more game characters of which a selection probability is set to a first base value, and a second group including one or more game characters of which a selection probability is set to a second base value; grant at least one of the game characters chosen by the draw to the user; count the number of times a game character of a third group, which is not included in the first group or the second group, has been granted to the user by the draw; when the count increases to satisfy a boost condition, boost a first selection probability value, which is a selection probability of game characters included in the first group, and a second selection probability value, which is a selection probability of game characters included in the second group; when a game character included in the first group has been granted to the user by the draw, change the first selection probability value, which has been boosted, to the first base value, and change the second selection probability value, which has been boosted, to the second base value; and when a game character included in the second group has been granted to the user by the draw and a boost value of the first selection probability is greater than a predetermined value, at least lower the first selection probability value, which has been boosted, so that the first selection probability value is greater than the first base value.

With configuration (1) above, even when a game character included in the first group or a game character included in the second group is granted by a draw, it is possible to motivate the user to continue to play the draw, and it is possible to improve the playability of the draw.

(2) The processor may be configured to further control the information processing system to at least: when a game character included in the first group is granted to the user by the draw, reset the count to zero; and when a game character included in the second group is granted to the user by the draw and the count is greater than a predetermined count, decrease the count so that the decreased count is equal to or greater than one. The first selection probability and the second selection probability may be each determined uniquely based on the count.

With configuration (2) above, since the selection probability is determined uniquely based on the count, the information processing system can easily perform the process of calculating the selection probability after the change. How selection probabilities are changed is easy-to-understand for the user.

(3) When a game character of the third group is granted to the user by the draw after the count is reset or decreased, the information processing system may re-start counting starting from the reset or decreased count.

With configuration (3) above, even after a game character of the first group or the second group is granted to the user, it is possible to motivate the user to continue to play the draw.

(4) When a game character included in the second group is granted to the user by the draw and a boost value of the first selection probability is less than the predetermined value, the information processing system may (a) change the first selection probability value, which has been boosted, to the first base value, and (b) change the second selection probability value, which has been boosted, to the second base value.

With configuration (4) above, it is possible to prevent the second selection probability from becoming less than the base value.

(5) A plurality of game characters may be chosen by one iteration of the draw. The processor may be configured to further control the information processing system to execute a draw mode for presenting, to the user, a plurality of candidate images corresponding to the plurality of game characters chosen by the iteration of the draw, and accepting one or more selection instruction to select one of the plurality of candidate images. A game character corresponding to the candidate image selected by the user in the draw mode may be granted to the user. If the count satisfies the boost condition during the draw mode, the first selection probability value and the second selection probability value may be each boosted after completion of the iteration of the draw mode.

With configuration (5) above, it is possible to give the user a choice of whether or not to successively give a selection instruction in the draw mode, and it is therefore possible to enhance the strategic aspect of the summon game.

(6) The first selection probability value and the second selection probability value may be displayed in the draw mode.

With configuration (6) above, since the user can check the current selection probability value while in the draw mode, it is possible to improve the convenience of the draw.

(7) The candidate images may represent types of game characters corresponding to the candidate images and may be images with which the game characters cannot be identified uniquely.

With configuration (7) above, it is possible to give a strategic aspect to the selection of candidate images, and it is possible to improve the playability of the draw.

(8) The information processing system may accept a selection instruction in the draw mode at least on a condition that points owned by the user be decreased. The number of points required for a selection instruction when the number of selectable candidate images is equal to a first number may be smaller than the number of points required for a selection instruction when the number of selectable candidate images is equal to a second number larger than the first number.

With configuration (8) above, it is possible to give a strategic aspect to the selection of whether to successively select a candidate image in the draw mode or to end the draw mode, and it is possible to improve the playability of the draw.

(9) The first base value and the second base value may be lower than a selection probability value set for game characters of the third group.

With configuration (9) above, it is possible to motivate many users to continue to play the draw.

(10) Game characters of the first group and game characters of the second group may be objects of the draw in an iteration of the draw performed in a first period. Game characters of the first group do not have to be objects of the draw and game characters of the second group may be objects of the draw in an iteration of the draw performed in a second period different from the first period.

With configuration (10) above, it is possible to motivate many users to continue to play the draw.

Note that the present specification discloses an information processing apparatus (e.g., a terminal apparatus or a server) configured to execute the processes recited in (1) to (10) above. The present specification also discloses a storage medium storing an information processing program that causes a computer to execute some or all of the processes recited in (1) to (10) above. The present specification also discloses an information processing method that is executed by the information processing system of (1) to (10) above.

With the information processing system, the information processing apparatus, the storage medium or the information processing method set forth above, it is possible to improve the playability of a draw for granting a game character.

These and other objects, features, aspects and advantages of the present invention will become more apparent from the following detailed description of the present invention when taken in conjunction with the accompanying drawings.

DETAILED DESCRIPTION OF NON-LIMITING EXAMPLE EMBODIMENTS

[1. Configuration of Information Processing System]

Figure 1:
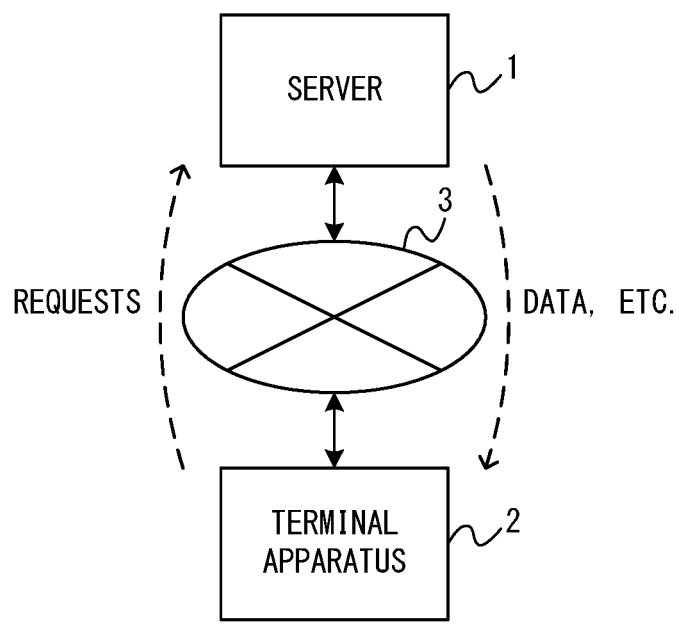
FIG. 1 is a block diagram showing an example of the configuration of a non-limiting information processing system according to the present embodiment.

Hereinafter, an information processing system, an information processing program, and an information processing method according to the present embodiment will be described. Firstly, description will be given of the overall configuration of the information processing system and the configurations of the terminal apparatus and a server included in the information processing system according to the present embodiment. FIG. 1 is a block diagram showing an example of the configuration of the information processing system according to the present embodiment. As shown in FIG. 1, the information processing system includes a server 1 and a terminal apparatus 2. The server 1 and the terminal apparatus 2 are connectable to a network 3, such as the Internet and/or a mobile communication network. The server 1 and the terminal apparatus 2 are communicable with each other via the network 3.

The server 1 is a server for providing services related to an application (specifically, a game application) to be executed in the terminal apparatus 2. In the present embodiment, the server 1 is a game server for a game to be executed in the terminal apparatus 2, and provides an environment for a game process to be executed in the terminal apparatus 2. For example, in response to a request from the terminal apparatus 2 that executes the game process, the server 1 executes a game process according to need, and transmits, to the terminal apparatus 2, data complying with the request (refer to FIG. 1).

The terminal apparatus 2 is an example of an information processing apparatus possessed by a user. Examples of the terminal apparatus 2 include a smart phone, a hand-held or stationary game apparatus, a mobile phone, a tablet terminal, a personal computer, and a wearable terminal. The terminal apparatus 2 is able to execute a game program (in other words, a game application) for a game for which the server 1 provides services.

(Specific Example of Configuration of Server 1)

Figure 2:
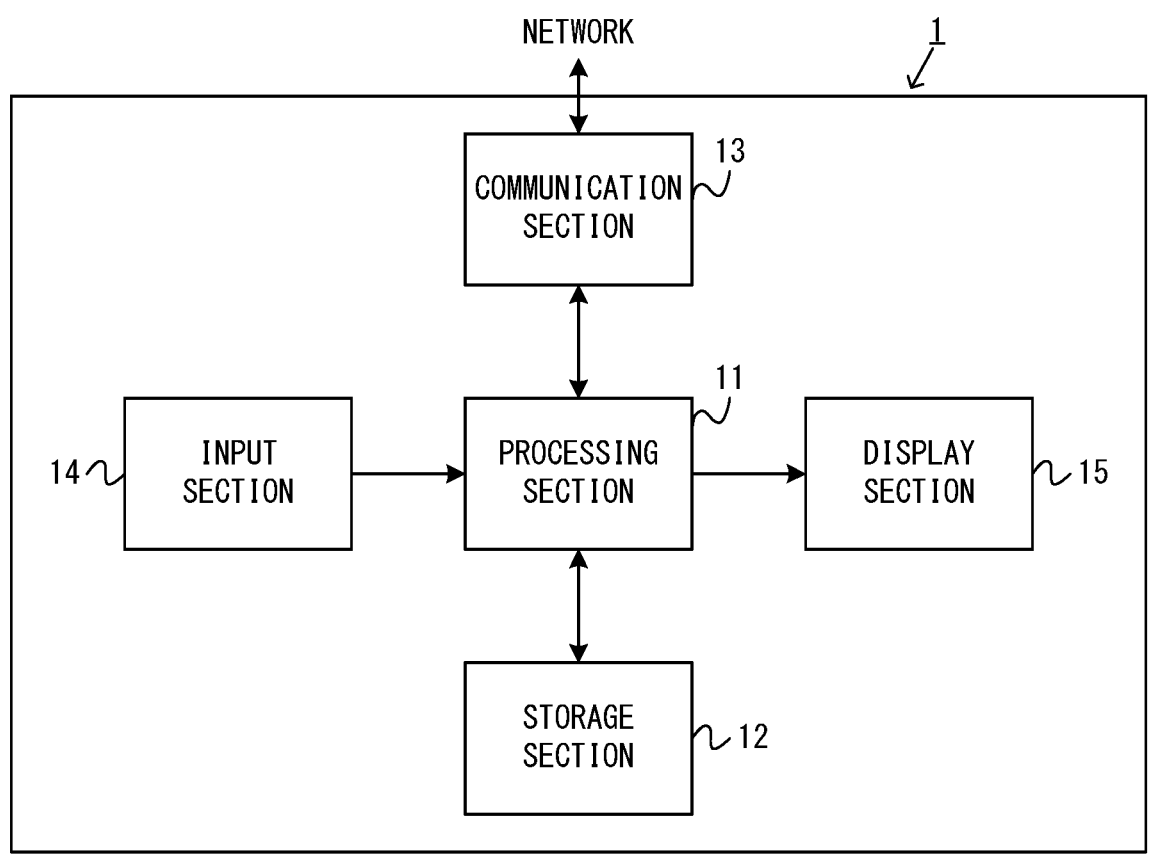
FIG. 2 is a block diagram showing an example of the configuration of a non-limiting server.

FIG. 2 is a block diagram showing an example of the configuration of the server 1. In FIG. 2, each of components included in the server 1 is implemented by one or more information processing apparatuses. In this specification, the "server" means one information processing apparatus (i.e., a server apparatus). When the function of the server is implemented by a plurality of server apparatuses, the "server" means the entirety of a server apparatus group (i.e., a server system). That is, the "server" may be a server apparatus or a server system. When a plurality of information processing apparatuses are included in the server system, these information processing apparatuses may be arranged in the same place or different places. The hardware configuration of the server 1 of the present embodiment may be the same as that for a conventional server.

As shown in FIG. 2, the server 1 includes a processing section 11 and a storage section 12. The processing section 11 is electrically connected to the components 12 to 15 of the server 1. The processing section 11 includes a CPU (Central Processing Unit, in other words, a processor) and a memory.

In the server 1, the CPU executes, using the memory, programs stored in the storage section 12, thereby executing various kinds of information processing. The storage section 12 is any storage device (also referred to as "storage medium") that is accessible to the processing section 11. The storage section 12 stores therein programs to be executed in the processing section 11, data to be used for information processing by the processing section 11, data obtained through the information processing, etc. In the present embodiment, the storage section 12 stores therein at least a program for a game process that is to be executed on the server side for a game process to be executed in the terminal apparatus 2.

The server 1 includes a communication section 13. The communication section 13 is connected to the network 3, and has a function of communicating with other devices (e.g., the terminal apparatus 2) via the network 3. Using the communication section 13, the processing section 11 transmits information to the other devices and receives information from the other devices. The server 1 further includes an input section 14 and a display section 15 as input/output interfaces.

(Specific Example of Configuration of Terminal Apparatus 2)

Figure 3:
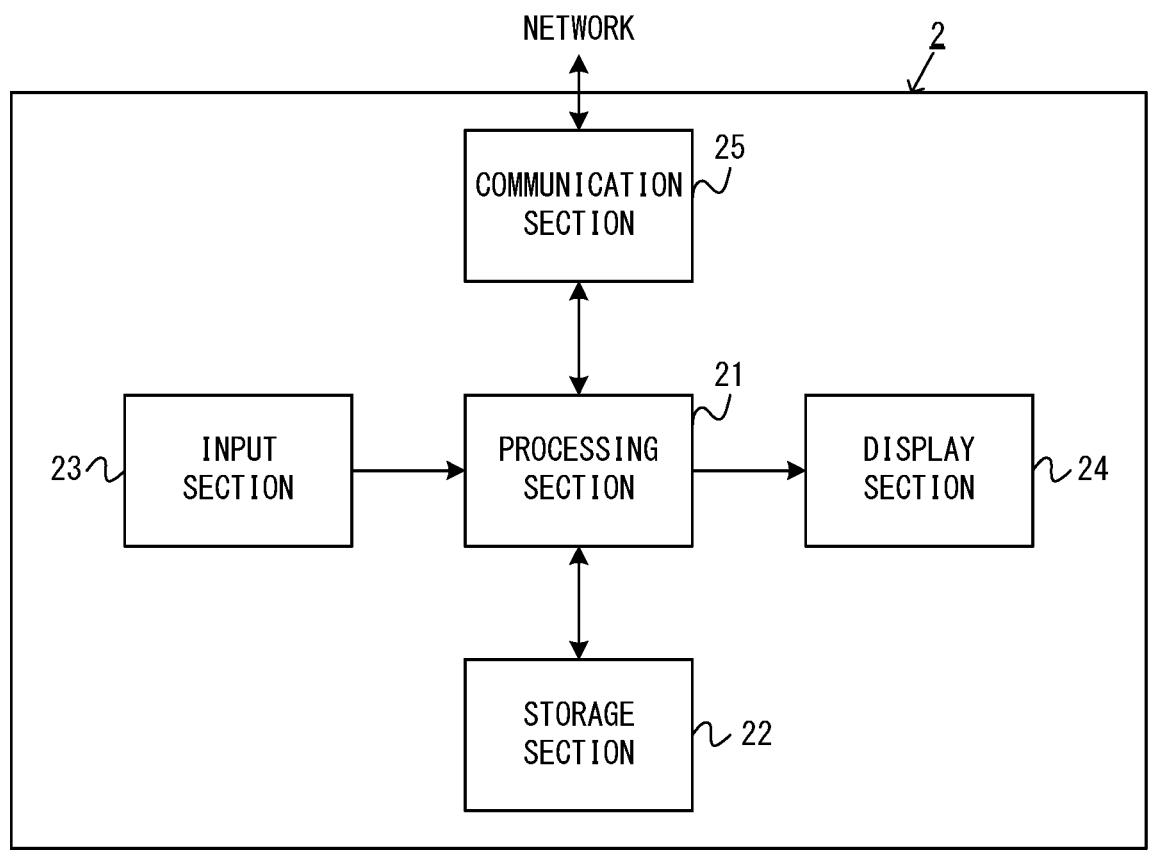
FIG. 3 is a block diagram showing an example of the configuration of a non-limiting terminal apparatus.

FIG. 3 is a block diagram showing an example of the configuration of the terminal apparatus 2. As shown in FIG. 3, the terminal apparatus 2 includes a processing section 21 and a storage section 22. The processing section 21 is electrically connected to the components 22 to 25 of the terminal apparatus 2. The processing section 21 includes a CPU (in other words, a processor) and a memory. In the terminal apparatus 2, the CPU executes, using the memory, a program (specifically, a game program) stored in the storage section 22, thereby executing various kinds of information processing. The storage section 22 stores therein programs to be executed in the processing section 21, data to be used for information processing by the processing section 21, data obtained through the information processing, etc. The storage section 22 may be a storage medium incorporated in a main body unit (specifically, a unit in which the processing section 21 is provided) of the terminal apparatus 2, or may be a storage medium (e.g., a card type storage medium) attachable/detachable with respect to the main body unit. The program may be stored in the main body unit by being downloaded from the server 1 to the terminal apparatus 2.

The terminal apparatus 2 includes an input section 23. The input section 23 outputs data based on an input performed by the user to the processing section 21. The processing section 21 determines the content of an input performed by the user based on data from the input section 23. The input section 23 may be any input device that receives an input performed by the user. In the present embodiment, the input section 23 includes a touch panel provided on a screen of a display section 24 described later. The input section 23 may include buttons and/or an inertial sensor (e.g., an acceleration sensor or a gyro sensor), etc., in addition to (or instead of) the touch panel. The input section 23 may be an input device provided in the main body unit of the terminal apparatus 2, or may be an input device (e.g., a game controller) separated from the main body unit.

The terminal apparatus 2 includes a display section 24. The display section 24 displays an image (e.g., a game image, etc.) that is generated through information processing executed in the processing section 21 of the terminal apparatus 2. The display section 24 may be a display device provided in the main body unit of the terminal apparatus 2, or may be a display device separated from the main body unit. The terminal apparatus 2 may include a speaker, a microphone, and/or a camera, etc.

The terminal apparatus 2 includes a communication section 25. In the present embodiment, the communication section 25 has a function of performing communication while being connected to a mobile communication network (in other words, a mobile telephone communication network). That is, the terminal apparatus 2 (specifically, the processing section 21) is connected to the network 3 by using the communication section 25 (in other words, through the communication section 25) via the mobile communication network, and communicates with other devices (e.g., the server 1, etc.). Using the communication section 25, the processing section 21 transmits information to the other devices and receives information from the other devices. The configuration of the communication section, through which the terminal apparatus 2 performs communication via the network 3, is arbitrary. For example, the communication section 25 may have a function of connecting to a wireless LAN through a communication module with Wi-Fi authentication, or may have both the function of connecting to the mobile communication network and the function of connecting to the wireless LAN.

[2. Outline of Process in Information Processing System]

Processes to be executed in an information processing system according to the present embodiment will now be outlined. In the present embodiment, the information processing system executes a summon game in a game application. In the summon game, the user is granted a game character corresponding to a selection candidate that is selected by the user from among a predetermined initial number (here, five) of selection candidates that have been chosen by a draw (a computer-simulated draw). Note that in the game of the present embodiment, granting of a game character to the user in a summon game is represented as a game character being summoned from another world. Therefore, in the present embodiment, granting a game character to the user is referred to as "summoning", and the game in which a game character is granted to the user is referred to as a summon game.

In the present embodiment, in addition to the summon game, a game that is played by using a game character that has been granted to the user in the summon game is also played in the game application. Note that a game character is not limited to a human-shaped game object (e.g., a player character controlled by the user), but also includes game objects such as weapons and items used in the game. The game that is played by using a game character may be of any content, and it may be a game such as a simulation game, a puzzle game, an action game or a race game.

Referring to FIG. 4 to FIG. 7, the summon game will now be described. In response to the user giving an instruction to start the summon game in the game application, the information processing system starts the summon game. When the summon game is started, the terminal apparatus 2 displays a start image on the display section 24.

Figure 4:
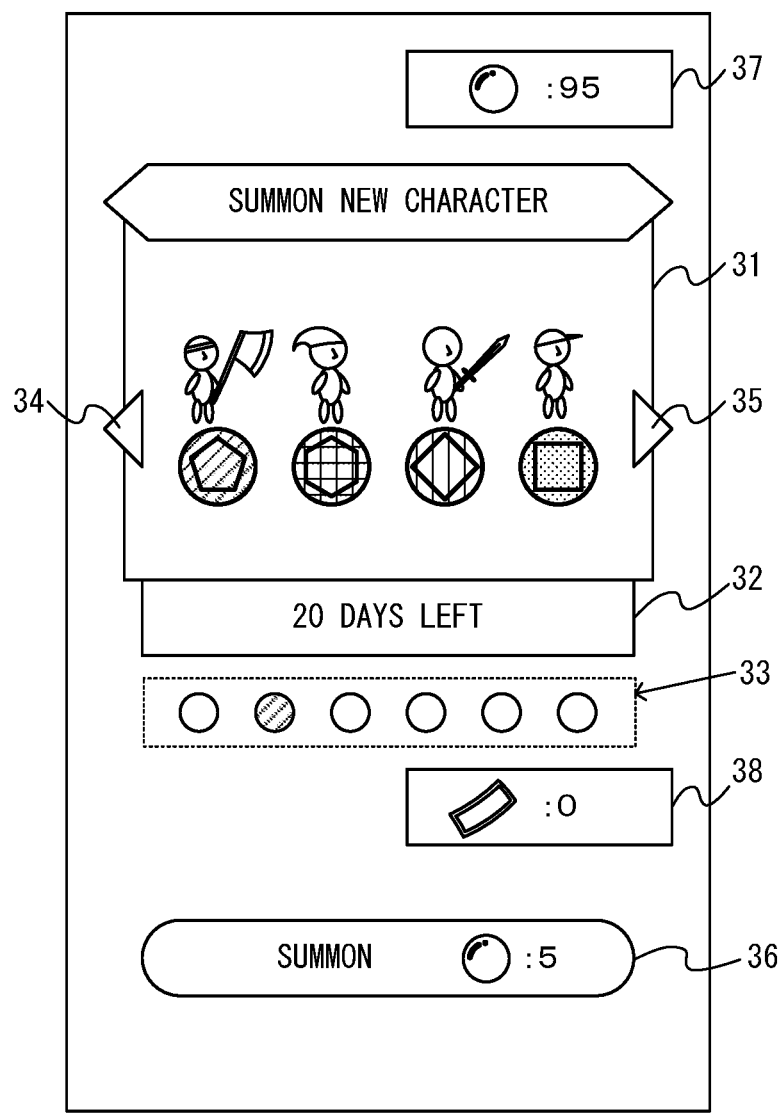
FIG. 4 is a diagram showing an example of a start image.

FIG. 4 is a diagram showing an example of the start image. As shown in FIG. 4, the start image includes a content image 31 that represents the content of the summon game. Here, in the present embodiment, it is assumed that the game application has different summon games. For example, a different game character may be more likely to be chosen by a draw in each summon game, or each summon game may use a different set of game characters from which game characters are chosen by a draw. There may be a certain game character that can be selected only in a particular summon game.

As the content of a summon game, the content image 31 includes the name of the summon game ("SUMMON NEW CHARACTER" in FIG. 4). In the present embodiment, the content image 31 shows, as the content of the summon game, some of the game characters that can be selected in the summon game (here, featured characters to be described below) (see FIG. 4). As will be later described in detail, in the present embodiment, each game character is assigned an attribute. The content image 31 includes images representing the game characters as well as images of attribute symbols representing attributes assigned to the game characters (see FIG. 4).

As shown in FIG. 4, the start image includes a period image 32 that represents the period in which the summon game represented by the content image 31 is executable. In the present embodiment, the executable period is set for each summon game. The period in which the summon game is executable is a period that is defined in real time, e.g., from Nov. 1, 2021 to Nov. 30, 2021. In the present embodiment, the period image 32 includes information that represents the remaining amount of time for which the summon game is executable, such as "20 DAYS LEFT", for example.

As shown in FIG. 4, the start image includes a plurality of summon game icons 33. Each summon game icon 33 represents one of a plurality of summon games provided in the game application that is executable at present. In the example shown in FIG. 4, six summon games are executable, and six summon game icons 33 are displayed. The draw icon that represents the summon game currently selected (i.e., the summon game corresponding to the content image 31) is displayed in a manner different from that for the other draw icons, which are not currently selected. Note that in FIG. 4, hatching is used to represent the difference in the manner of display of the draw icon.

As shown in FIG. 4, the start image includes switch instruction images 34 and 35 used for giving a switch instruction to switch the selected summon game to another. That is, in response to the user performing an input on the switch instruction image 34 or 35, the selected summon game is switched to another, and the content image 31 and the period image 32 are also switched accordingly. Note that although it is assumed in the present embodiment that an input performed on various images displayed on the display section 24 of the terminal apparatus 2 is performed by touching on the images, for example, the method by which the user performs an input for giving an instruction may be any method.

As shown in FIG. 4, the start image includes a start button image 36 used for giving a start instruction to start the draw mode in the summon game shown in the content image 31. As will be later described in detail, the draw mode is a mode in which a plurality of selection candidates (specifically, attribute symbols) corresponding to a plurality of game characters that have been chosen by a draw are presented to the user, and the user selects one or more selection candidates from among the presented selection candidates, thereby granting the user a game character that corresponds to the selected selection candidate. In the present embodiment, in response to a start instruction given by the user making an input on the start button image 36, the draw mode of the summon game being selected is started. As described above, the user can select a desired summon game from among a plurality of summon games executable by making an input on the switch instruction images 34 and 35, and can start the draw mode of the summon game by making an input on the start button image 36 while the desired summon game is being selected.

Here, in the present embodiment, summoning in the summon game (i.e., granting of a game character to the user) is performed in exchange for consumption of summon points that are used in the game (note however that summoning can be performed without consuming summon points under certain conditions in the present embodiment). Therefore, the start button image 36 includes information that represents the amount of summon points to be consumed in exchange for summoning in response to an input performed on the start button image 36. In the example shown in FIG. 4, it is indicated that five summon points will be consumed for summoning in response to an input performed on the start button image 36. Note that the summon points may represent the number of particular items owned by the user in the game, for example.

As shown in FIG. 4, the start image includes a point ownership image 37 that indicates the amount of summon points currently owned by the user. In the present embodiment, the user can obtain summon points by purchasing summon points with real currency or by satisfying conditions in the game application (e.g., clearing a particular game stage).

As shown in FIG. 4, the start image includes a ticket ownership image 38 that represents the number of tickets currently owned by the user. A ticket is an item in the game and is an example of an item with which it is possible to summon without consuming summon points. In the present embodiment, it is possible to start a draw mode in the summon game in exchange for consuming one ticket instead of consuming summon points. In the present embodiment, the user can obtain a ticket by satisfying a condition in the game application.

Note that when a summon is performed while the user owns both summon points and a ticket, either summon points or a ticket may be consumed preferentially over the other, or the user may be allowed to specify which one to consume. Note that the method for summoning without consuming summon points is not limited to the method of summoning by consuming a ticket. For example, in other embodiments, the information processing system may allow the first summon in the summon game to be performed without consuming summon points.

Note that although not shown, the start image may include a button image used for giving an instruction to display a menu image or a button image used for giving an instruction to start another game other than the summon game. When an input is performed on these button images, the terminal apparatus 2 ends the summon game mode.

Figure 5:
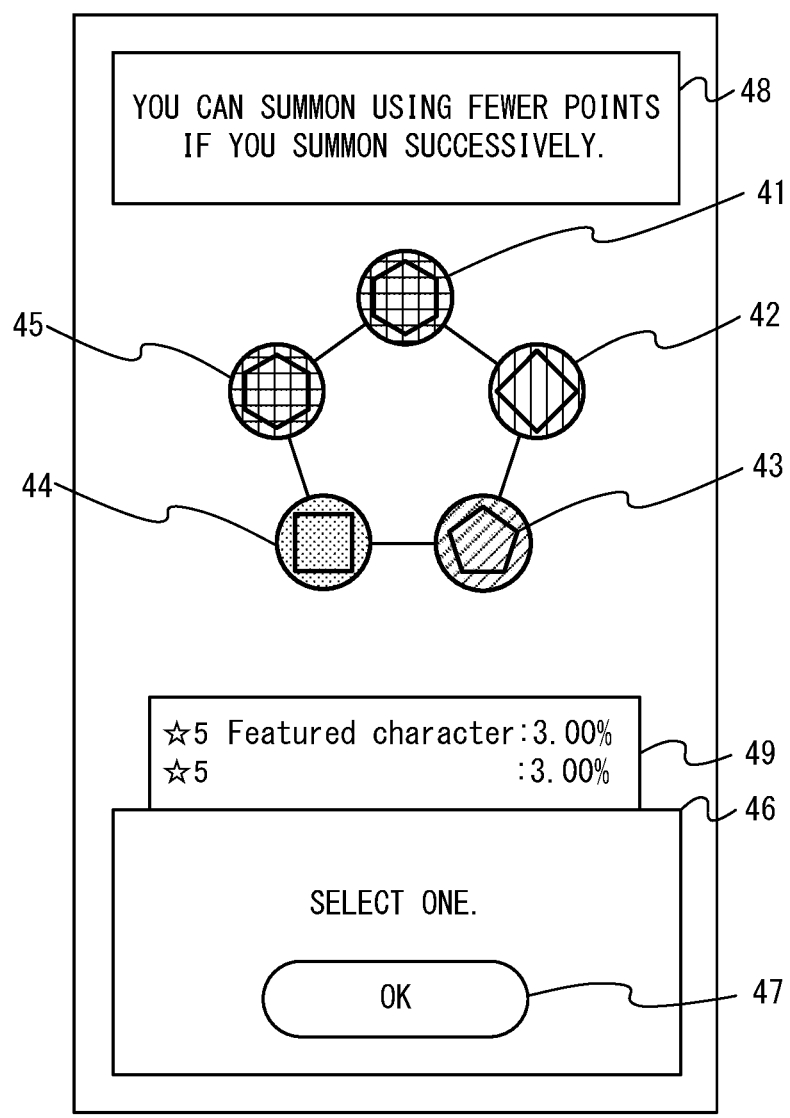
FIG. 5 is a diagram showing an example of a candidate selection image.

When the start instruction is given while the start image is displayed, the draw mode in the summon game is started. In the draw mode, first, the terminal apparatus 2 displays a candidate selection image on the display section 24. The candidate selection image is a user interface image for accepting, from the user, a selection instruction to select one of candidate images (specifically, attribute symbols). Referring to FIG. 5, the details of the candidate selection image will now be described.

FIG. 5 shows an example of a candidate selection image. As shown in FIG. 5, the candidate selection image includes five attribute symbols 41 to 45, which are five selection candidates from which the user can make a selection. The attribute symbols 41 to 45 represent the attributes of the game characters that have been chosen by a draw, which are game characters corresponding to the selection candidates.

Here, in the present embodiment, each game character has one of the following attributes: red attribute, blue attribute, green attribute and colorless attribute. Note that for each game character, the server 1 stores information representing the attribute assigned to the game character in association with the game character. In the present embodiment, the attribute symbols representing the attributes are displayed in colors of the respective attributes. Note that in FIG. 5, the different colors of the attribute symbols are represented by different hatching (this similarly applies to other figures).

Note that the attribute of a game character is information that is assigned to each game character and is an example of a property that is assigned to the game character. The property of a game character means to include, for example, type, state, ability, etc., of the game character, as well as the attribute of the game character. The property of a game character can be any information based on which the game character can be classified into a number of classes (fewer than the number game characters). Note that in other embodiments, multiple properties (specifically, attributes) may be assigned to one game character. Then, an attribute symbol may represent any one of a plurality of attributes assigned to the game character. An attribute of a game character (which is assigned a plurality of attributes) that is represented by the attribute symbol may be randomly determined, may be predetermined, or may be determined according to a predetermined condition (e.g., a condition related to parameters of the game character).

Note that the number of selection candidates presented when the draw mode is started (i.e., the initial candidate count) is five in the present embodiment, but the initial candidate count in other embodiments does not need to be fixed and may be variable. For example, the initial candidate count may vary for different summon games, or the initial candidate count may change randomly.

In the present embodiment, when the start instruction is given, the information processing system chooses, by a draw, five game characters that are to be selection candidates from among game characters that are objects of the draw (i.e., game characters that can be granted to the user). Then, attribute symbols that represent the attributes of the chosen game characters are displayed on the terminal apparatus 2. Thus, in the present embodiment, in the draw mode, the user cannot uniquely identify game characters, which are selection candidates, but can select one of the selection candidates in a state in which the user can recognize the attribute of the game character based on the attribute symbol.

Note that the specific method of the draw to choose game characters to be selection candidates may be any method. In the present embodiment, the server 1 stores information in which each game character, which is an object of the draw, is associated with a numerical value that represents the selection probability. The server 1 performs the draw using a random number so that each game character will be chosen with the probability based on the numerical value. Note that this numerical value may be a numerical value expressed in percentage or a numerical value that represents the degree of selection probability (e.g., the higher the numerical value, the more likely the game character will be chosen).

In the present embodiment, game characters are classified into a plurality of groups each having a different selection probability. In the present embodiment, each game character is assigned a rarity level, and the selection probability is set depending on the rarity level. Specifically, each game character is assigned a rarity level of 3 to 5, wherein a game character of a higher rarity level is assigned a lower selection probability. Note that in the present embodiment, a game character whose rarity level is 3 or 4 is called a "normal character" and a game character whose rarity level is 5 is called a "rare character".

Note that the game characters classified as normal characters do not need to have a constant selection probability, and the game characters classified as rare characters do not need to have a constant selection probability. The selection probabilities of the normal characters and/or the rare characters may vary between different summon games.

In the present embodiment, rare characters are classified into featured characters and non-featured characters. The criteria for the classification between featured characters and non-featured characters is arbitrary. In the present embodiment, which game characters from among rare characters are to be featured characters and which game characters from among rare characters are to be non-featured characters are determined for each summon game. A featured character is a game character that is the centerpiece of the summon game, for example. In the present embodiment, a game character newly added as a game character that can be granted in a summon game or a game character that can be obtained only in a summon game that can be played only for a limited time from among a plurality of summon games may be set as a featured character.

In the present embodiment, a base value is set as the selection probability for each game character. When the summon game is played first, the selection probability of each game character is set to the base value, and the information processing system chooses game characters to be selection candidates using such a selection probability. In the present embodiment, the base value of the selection probability of rare characters is set to 3[%]. The base value of the selection probability of normal characters is set to a value greater than 3[%]. Note that while the base value of the selection probability of featured characters and the base value of the selection probability of non-featured characters are equal to each other in the present embodiment, they may be different values from each other in other embodiments. In other embodiments, the base value of the selection probability may vary between different rare characters. As will be later described in detail, in the present embodiment, the selection probability of each game character may be changed from the base value described above.

As shown in FIG. 5, the candidate selection image includes a probability image 49. In the present embodiment, the probability image 49 represents selection probabilities of rare characters (i.e., featured characters and non-featured characters). In FIG. 5, the probability image 49 shows both the selection probability of a featured character (i.e., the label "Featured character: 3.00%") and the selection probability of a non-featured character (i.e., the label ":3.00%"). The selection probability value represented by the probability image 49 is the selection probability value at present, and the value will be different from the base value when the selection probability is changed from the base value. Note that the probability image 49 may represent the selection probability of normal characters, in addition to the selection probability of rare characters.

As shown in FIG. 5, the candidate selection image includes a selection window 46. The selection window 46 includes a message (the message "SELECT ONE" in FIG. 5) that prompts the user to select a selection candidate (specifically, an attribute symbol). The selection window 46 also includes a selection confirm button 47 used for giving a selection instruction to select a selection candidate. While the candidate selection image is displayed, the user first performs an input of specifying one of the attribute symbols 41 to 45, and further performs an input on the selection confirm button 47, thereby giving a selection instruction. This means that the designated attribute symbol (i.e., a selection candidate) has been selected.

When the user gives a selection instruction, the game character corresponding to the selected attribute symbol is granted to the user. Specifically, the terminal apparatus 2 displays on the display section 24 a special effects image that shows the game character being summoned to appear, and grants the game character to the user.

In the present embodiment, in a single iteration of the draw mode started by the start instruction, the user can select at least one and a maximum of five attribute symbols from among the five attribute symbols corresponding to the five game character chosen by a draw. That is, when a selection instruction is given while the candidate selection image shown in FIG. 5 is displayed, the user may either further give a selection instruction by continuing the draw mode or end the draw mode without giving a further selection instruction.

Figure 6:
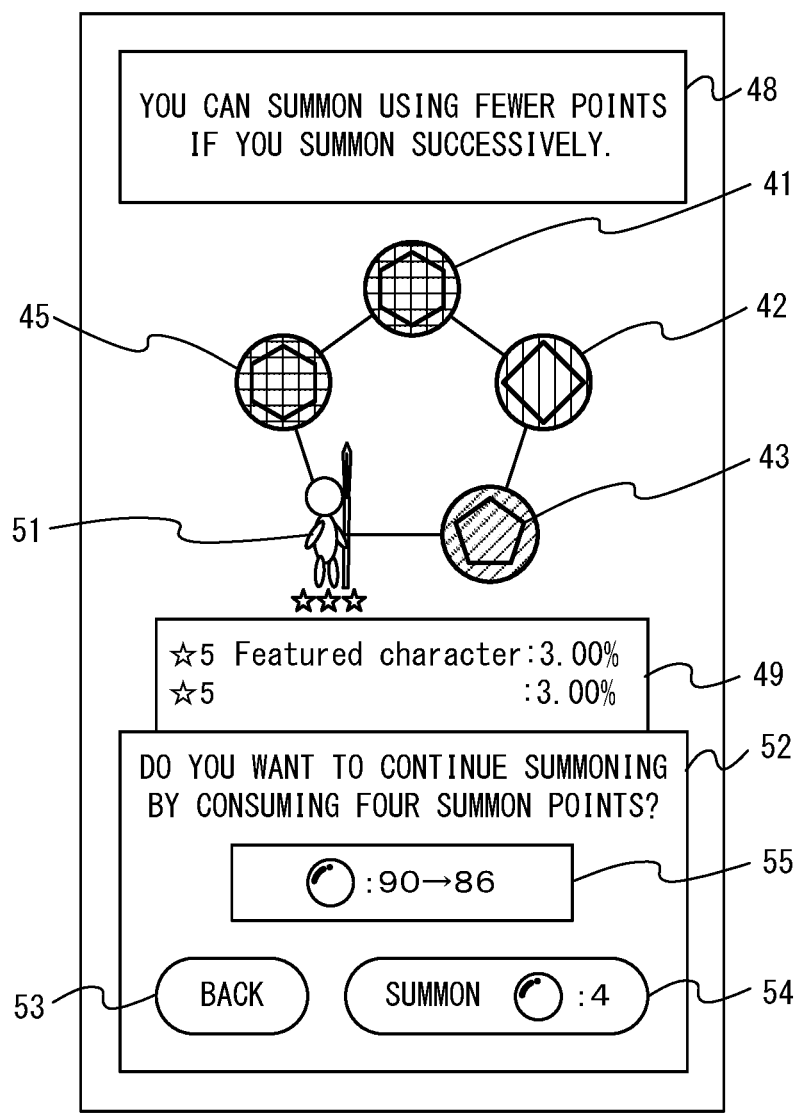
FIG. 6 is a diagram showing another example of a candidate selection image.

FIG. 6 shows another example of a candidate selection image. The candidate selection image shown in FIG. 6 is one that is displayed on the display section 24 after one game character has been granted in response to a selection instruction given for the candidate selection image shown in FIG. 5. Note that it is assumed herein that a selection instruction has been given to select the attribute symbol 44 among the attribute symbols 41 to 45 included in the candidate selection image shown in FIG. 5.

As shown in FIG. 6, in the candidate selection image displayed after the attribute symbol 44 is selected, a character image 51 that represents a game character corresponding to the attribute symbol 44 is displayed instead of the attribute symbol 44. Therefore, in the state shown in FIG. 6, the number of selection candidates is four.

Note that in the present embodiment, the character image 51 includes an image that represents the rarity level of the game character. In FIG. 6, the rarity level of the game character represented by the character image 51 is three, and the character image 51 therefore includes an image of three starts, which represents the rarity level. By looking at the character image included in the candidate selection image, the user can check the game characters granted in the current iteration of the draw mode and the rarity levels thereof.

As shown in FIG. 6, the candidate selection image that is displayed after a game character has been granted includes a continuation confirm window 52. The continuation confirm window 52 includes a message asking the user whether or not to continue the draw mode (the message "DO YOU WANT TO CONTINUE SUMMONING BY CONSUMING FOUR SUMMON POINTS?" in FIG. 6). The continuation confirm window 52 includes a back button image 53 and a continue button image 54. The back button image 53 is a button image used for giving an end instruction to end the draw mode being currently executed. That is, in response to an input performed by the user on the back button image 53, the terminal apparatus 2 ends the draw mode and displays the start image described above on the display section 24.

The continue button image 54 is a button image used for giving a continue instruction to continue the draw mode being executed. That is, in response to an input performed by the user on the continue button image 54, the terminal apparatus 2 erases the continuation confirm window 52 and displays the selection window 46 in place of the continuation confirm window 52 (see FIG. 5). This allows the user to give a selection instruction again.

Thus, in the present embodiment, each time a game character is granted to the user in response to a selection instruction, the continuation confirm window 52 is displayed, and the user can select whether to end or to continue the draw mode. Then, if the user keeps selecting in the draw mode, the user can give the selection instruction five times. Note that after the fifth selection instruction is given, the terminal apparatus 2 ends the draw mode and displays the start image again (see FIG. 4). Note that when ending the draw mode, the terminal apparatus 2 may display the start image after displaying an image representing the five game characters granted (e.g., an image including images of the game characters instead of the attribute symbols in the candidate selection image) as an image representing the result of the current iteration of the draw mode.

Note that in the present embodiment, since summon points are consumed for each summon, the second and subsequent selections in a single iteration of the draw mode are also done in exchange for consuming summon points. That is, in the present embodiment, the user may give a start instruction or a continue instruction described above in exchange for consuming summon points. Here, in the present embodiment, the amount of summon points to be consumed for a start instruction or a continue instruction in a single iteration of the draw mode is determined based on the number of summons performed in the draw mode. Specifically, a start instruction to perform the first summon in the draw mode can be given in exchange for consuming five summon points. A continue instruction to perform the second to fourth summon in the draw mode can be given in exchange for consuming four summon points per instruction. A continue instruction to perform the fifth summon in the draw mode can be given in exchange for consuming three summon points. Thus, in the present embodiment, it can be said that the amount of summon points to be consumed for a start instruction or a continue instruction is determined based on the number of selection candidates that have been unselected in the current iteration of the draw mode.

In the present embodiment, the continue button image 54 includes information that represents the amount of summon points (here, four) to be consumed for a selection instruction using the continue button image 54. The continuation confirm window 52 includes a change-of-points image 55 that represents the change of summon points owned by the user when the selection instruction is given. With the continue button image 54, the user can check the summon points to be consumed for a selection instruction, and with the change-of-points image 55, the user can check the number of points owned by the user before and after the selection instruction.

Thus, in the present embodiment, if the user performs five iterations of the draw mode while selecting only one selection candidate in each iteration, a total of 25 summon points will be consumed. In contrast, if the user selects all of the five selection candidates in a single iteration of the draw mode, a total of 20 summon points will be consumed. That is, in the latter case, as compared with the former case, it is possible to reduce the amount of summon points to be consumed for selecting five selection candidates. In the present embodiment, the candidate selection image includes an information notification window 48 (see FIG. 5 and FIG. 6), and the information notification window 48 includes a message indicating that the consumption of summon points can be reduced by successively giving selection instructions in a single iteration of the draw mode (the message "YOU CAN SUMMON USING FEWER POINTS IF YOU SUMMON SUCCESSIVELY" in FIG. 5 and FIG. 6).

On the other hand, in the present embodiment, since attribute symbols are displayed in the candidate selection image, the user can guess, based on the attribute symbols, whether there is a possibility of obtaining a desired game character in the current iteration of the draw mode. For example, where a game character desired by the user is of the red attribute, assume a case where two of the five attribute symbols displayed in the candidate selection image are of the red attribute. In this state, the user will not obtain the desired game character by selecting any of the three non-red attribute symbols, and in order to obtain the desired game character, the user can employ a strategy of selecting the two red attribute symbols, ending the draw mode, and then starting a new iteration of the draw mode. In the state described above, the user may also employ a strategy of selecting the five attribute symbols in order to reduce the number of summon points to be consumed.

Thus, in the present embodiment, the user may draw using any of two strategies in the draw mode: (a) reducing the consumption of summon points by continuing the draw mode, and (b) ending an iteration of the draw mode in the middle and then starting a new iteration of the draw mode in order to increase the probability of obtaining the desired game character. Therefore, it is possible to enhance the strategic aspect of the summon game and improve the playability of the game.

In the present embodiment, when receiving various instructions by the user (e.g., a selection instruction, a start instruction, etc.), the terminal apparatus 2 may display an instruction confirm window. For example, when a start instruction is received by the user, the terminal apparatus 2 may display the message "START?" and an instruction confirm window that includes a back button image and an execute button image. Then, when an input is performed on the execute button image, the terminal apparatus 2 may determine that the start instruction has been confirmed. On the other hand, when an input is performed on the back button image, the terminal apparatus 2 may determine that the selection instruction has not been confirmed, erase the instruction confirm window, and go back to the state in which the terminal apparatus 2 is ready to accept a start instruction.

Next, the process of changing selection probabilities of game characters will be described. In the present embodiment, the information processing system counts the number of times a normal character is granted in the draw mode, and the selection probability of rare characters is boosted based on the count (hereinafter referred to as the "count value").

Figure 7:
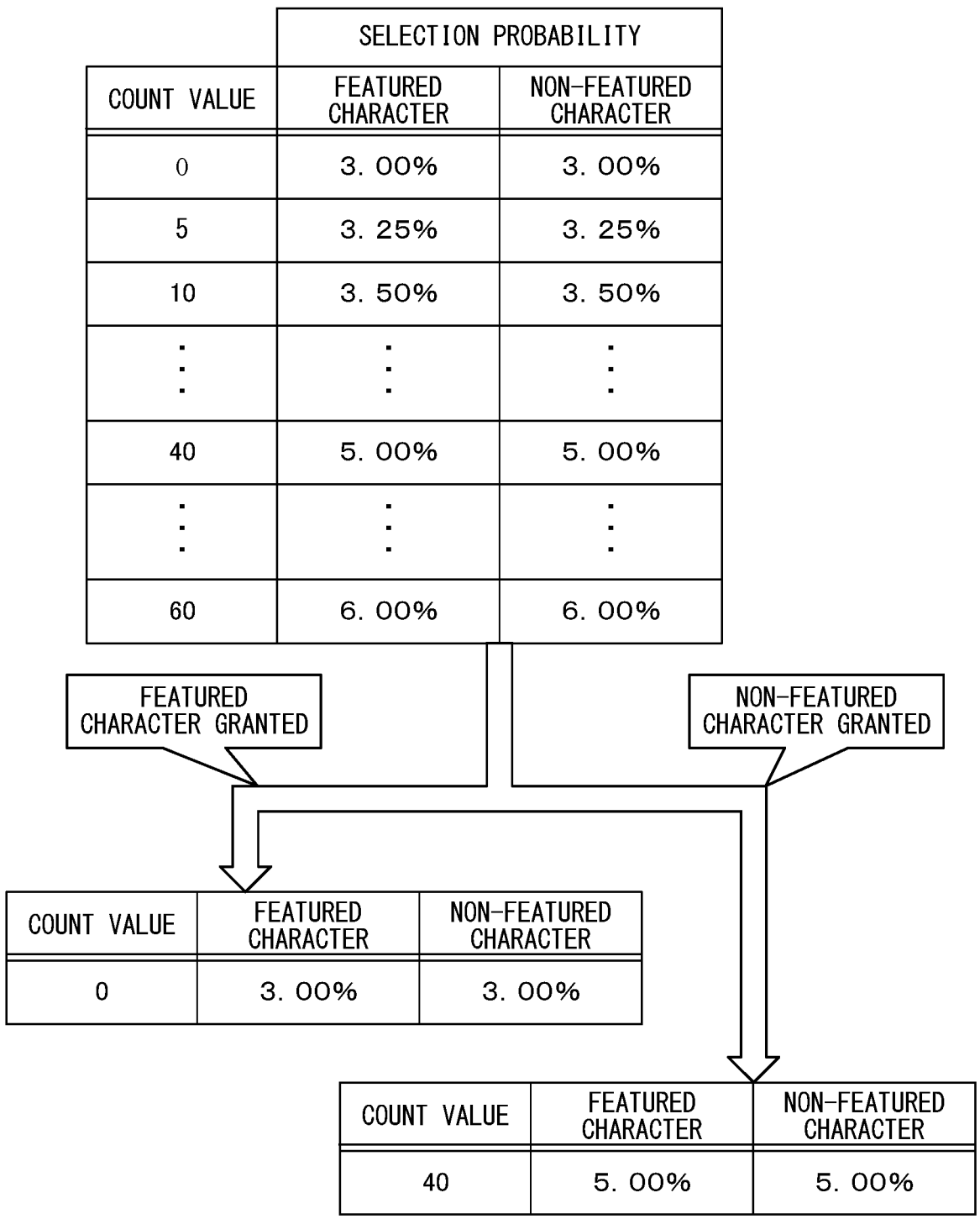
FIG. 7 is a diagram showing an example of how selection probabilities of rare characters are changed.

FIG. 7 is a diagram showing an example of how selection probabilities of rare characters are changed. In the present embodiment, the grant count value is counted each time a normal character is granted in the summon game. Note that although the count value initially represents the number of times normal characters have been granted successively in the draw mode, once a rare character is granted to the user, the count value may be reset or lowered (details will be described below). Therefore, in such a case, the count value may be a value that is different from the number of times normal characters have been granted successively.

In the present embodiment, as shown in FIG. 7, when the count value reaches five, the information processing system boosts the selection probability of rare characters that can be chosen in the summon game from the base value (3[%] in the present embodiment) by a unit boost value (0.25[%] in the present embodiment).

As described above, if the count value reaches five in one iteration of the draw mode, and the next iteration of the draw mode is started while the selection probability of rare characters is set to 3.25[%]. That is, in the next iteration of the draw mode, a rare character is more likely to be chosen by a draw, as compared with the previous iteration of the draw mode. Thus, a user who has not been able to obtain a rare character in the summon game can be motivated to continue to play the summon game. Note that since the selection probability of rare characters is boosted, the selection probability of at least one normal character relatively lowers.

In the present embodiment, each time the count value reaches a probability boost count, the information processing system boosts the selection probability of rare characters from the current value by the unit boost value. That is, in the present embodiment, the selection probability of rare characters boosts gradually as the count value increases. Note that in the present embodiment, probability boost counts are multiples of five (see FIG. 7). Note however that the values of the probability boost counts are arbitrary. Although a plurality of values are set as the probability boost count in the present embodiment, only one value may be set as the probability boost count in other embodiments.

As described above, in the present embodiment, the boosted selection probability of rare characters is determined uniquely based on the count value. Note that in the present embodiment, the selection probability of rare characters and the count value are correlated so that the selection probability is determined uniquely based on the count value. As will be later described in detail, also when the selection probability of rare characters is lowered, as when it is boosted, the (lowered) selection probability is determined based on the count value in accordance with the correlation.

In the present embodiment, when a rare character is granted to the user in the draw mode, the information processing system lowers the selection probability of rare characters. Here, in the present embodiment, in the case described above, the information processing system uses different methods of changing the selection probability of rare characters between when a featured character is granted to the user and when a non-featured character is granted to the user.

Specifically, when a featured character is granted to the user in the draw mode, the information processing system resets (i.e., sets to zero) the count value. In the case described above, the information processing system changes the selection probability values of both rare characters (i.e., featured characters and non-featured characters) to those when the count value is zero, i.e., the base values. That is, in the case described above, the selection probabilities of featured characters and non-featured characters are reset to the base values (i.e., 3[%]) (see FIG. 7).

On the other hand, when a non-featured character is granted to the user in the draw mode, the information processing system decreases the count value by a predetermined number (20 in the present embodiment). In the case described above, the information processing system changes the selection probability values of both featured characters and non-featured characters to values that correspond to the decreased count value. The example shown in FIG. 7 is directed to a case where a non-featured character is granted to the user when the count value has reached 60 and the selection probabilities of featured characters and non-featured characters, which are rare characters, are 6[%]. In this case, the count value is decreased to 40, and the selection probabilities of featured characters and non-featured characters, which are rare characters, are lowered to values (i.e., 5[%]) that are determined uniquely based on the decreased count value (i.e., 40) based on the correspondence described above.

Note that where the count value is lowered by the predetermined count, if a value obtained by subtracting the predetermined count from the current count value is less than the initial value (i.e., zero), the information processing system changes the count value to the initial value. In this case, the selection probabilities of rare characters is reset to the base value. That is, the process of decreasing the count value determines the decreased count while using zero as the lower limit, and the process of lowering the selection probability value of rare characters determines the lowered value while using the base value as the lower limit.

As described above, in the present embodiment, when a non-featured character has been granted to the user by draw and the boost value of the selection probability of the featured character is less than the predetermined value (here, 1[%]), the information processing system (a) changes the selection probability of featured characters, which has been boosted, to the base value, and (b) changes the selection probability value of non-featured characters, which has been boosted, to the base value. Then, it is possible to prevent the selection probability of featured characters from becoming less than the base value.

Note that in the present embodiment, since the predetermined count is 20, when a non-featured character is granted to the user in the draw mode, the selection probability of rare characters is decreased by 1[%], which corresponds to 20 draws. That is, when the amount of boost of the selection probability of rare characters from the base value is greater than 1[%] (i.e., 1.25[%] or more; in other words, the count value is equal to or greater than 25), even if the selection probability is decreased as a result of a non-featured character being granted, the decreased selection probability will be greater than the base value.

As described above, in the present embodiment, when a non-featured character is granted to the user by a draw and the boost value of the selection probability of featured characters is greater than a predetermined value (here, 1[%]), the information processing system lowers the selection probability value of rare characters to be greater than the base value. Thus, since the selection probability of rare characters is higher when a non-featured character is granted to the user than when a featured character is granted to the user, it is possible to motivate the user, who has been granted a non-featured character, to continue to play the summon game.

Note that in the present embodiment, when a featured character is granted to the user, the information processing system resets the successive count to zero. When a non-featured character is granted to the user and the count value is greater than a predetermined count (here, 20) (i.e., when the boost value of the selection probability of featured characters is greater than the predetermined value (here, 1[%]), the information processing system decreases the count value so that the decreased count is equal to or greater than one. Then, the selection probabilities of rare characters (i.e., featured characters and non-featured characters) are each determined uniquely based on the count value. Thus, the selection probabilities of rare characters (i.e., featured characters and non-featured characters) can each be managed so that the selection probabilities are determined uniquely based on the count value. Therefore, it is easy to perform the process of calculating the changed selection probabilities. Moreover, how the selection probabilities are changed is easy-to-understand for the user.

Note that in the present embodiment, the information processing system associates the selection probabilities of featured characters and non-featured characters with the count value, and boosts or lowers the selection probabilities by increasing or decreasing the count value. In other embodiments, the information processing system may boost or lower the selection probabilities of featured characters and non-featured characters without associating the selection probabilities with the count value. For example, the information processing system may lower the selection probabilities by the method according to a variation to be described below.

In this variation, when a non-featured character is granted to the user in the draw mode, the information processing system changes the selection probability value of non-featured characters to the base value, and lowers the selection probability value of featured characters by a predetermined value (e.g., 2[%]). For example, when a non-featured character is granted to the user where the selection probabilities of featured characters and non-featured characters, which are rare characters, are 6[%], the selection probability of featured characters is changed to 4[%] and the selection probability of non-featured characters is changed to 3[%] (i.e., the base value). Note that when lowering the selection probability value of featured characters by the predetermined value, if a value obtained by subtracting the predetermined value from the current selection probability value is less than the base value, the information processing system changes the selection probability value of featured characters to the base value. That is, also in this variation, as in the embodiment described above, the process of lowering the selection probability value of featured characters is performed while using the base value as the lower limit.

Note that in this variation, when a featured character is granted to the user in the draw mode, the selection probabilities of featured characters and non-featured characters are reset to the respective base values, as in the embodiment described above.

As described above, in the variation described above, when a non-featured character is granted to the user and the boost value of the selection probability of featured characters is greater than a predetermined value (2[%] as shown in the variation described above), the information processing system at least lowers the selection probability value of rare characters so that the selection probability value of featured characters is greater than the selection probability value of non-featured characters. As in the present embodiment, this also motivates the user, who has been granted a non-featured character, to continue to play the summon game.

Note that in the variation described above, in the case described above, the information processing system (a) changes the selection probability value of non-featured characters to the base value, and (b) decreases the selection probability value of featured characters by the predetermined value. Thus, the information processing system can set the selection probability of featured characters to be higher than the selection probability of non-featured characters.

Note that in other embodiments, in the case described above, the method of changing the selection probability may be any method as long as the selection probability of featured characters can be made higher than the base value. For example, in other embodiments, in the case described above, the information processing system may lower the selection probability of non-featured characters while not changing the selection probability of featured characters. In other embodiments, in the case described above, the information processing system may lower the selection probability of non-featured characters by a first value while lowering the selection probability of featured characters by a second value smaller than the first value (e.g., a half of the first value).

Note that as described above, the base value of the selection probability of featured characters and the base value of the selection probability of non-featured characters may be different from each other. Where the base values are different from each other, the information processing system may change the selection probability of featured characters and the selection probability of non-featured characters so that the ratio therebetween remains constant. For example, where the base value of featured characters is 5[%] and the base value of non-featured characters is 3[%], the information processing system may boost the selection probability of featured characters by 0.3125[%] and the selection probability of non-featured characters by 0.1875[%] each time the boost condition is satisfied. Thus, the selection probability of featured characters and the selection probability of non-featured characters can be boosted while maintaining the ratio therebetween (5:3 in the example above).

Here, with the method of changing the selection probability of featured characters and the selection probability of non-featured characters so that the ratio therebetween remains constant as described above, the selection probability having been boosted from the base value may be a repeating decimal, depending on the base values of featured characters and non-featured characters. In such a case, where the selection probabilities of featured characters and non-featured characters are changed without being associated with the count value as in the variation described above, repeating decimals may be rounded up or down when the selection probabilities are boosted and when the selection probabilities are thereafter lowered, and a difference may occur between the value before being boosted and the value after being lowered. Then, the ratio may deviate, and it may not be possible to maintain the ratio constant.

In contrast, according to the present embodiment, the selection probabilities of featured characters and non-featured characters are associated with the count value so that the selection probabilities are determined uniquely based on the count value, and the selection probabilities are boosted or lowered by increasing or decreasing the count value. Then, such a deviation will not occur when boosting and lowering the selection probabilities, and it is possible to manage the selection probabilities so that the ratio described above remains constant.

Note that as described above, in the present embodiment, the information processing system changes the selection probability by different methods depending on whether the boost value of the selection probability is equal to or greater than a predetermined value or the boost value is less than the predetermined value. Here, in other embodiments, the information processing system may change the selection probability by the same method, irrespective of whether the boost value of the selection probability is equal to or greater than a predetermined value or the boost value is less than the predetermined value. For example, when a rare character is granted to the user by a draw, the information processing system may change the selection probability value of non-featured characters to the base value while decreasing the selection probability value of featured characters by a predetermined proportion (e.g., a half) of the decrement value of the selection probability of non-featured characters. Also by this method, as in the present embodiment, the selection probability of featured characters can be set to be higher than the selection probability of non-featured characters.

In the present embodiment, the selection probabilities of game characters are changed after completion of one iteration of the draw mode. That is, in one iteration of the draw mode, when the updated count value satisfies the boost condition (specifically, when it is a multiple of five), the information processing system boosts the selection probability values of rare characters after completion of the draw mode. Then, the user can play the draw by using two strategies, i.e., a strategy of continuing the current iteration of the draw mode and a strategy of ending the current iteration of the draw mode and starting a new iteration of the draw mode (where the selection probabilities of rare characters have been boosted). Therefore, it is possible to enhance the strategic aspect of the summon game and improve the playability of the game. Note that in other embodiments, the selection probabilities of game characters may be changed while in the draw mode.

As described above, in the present embodiment, the probability image 49 described above is displayed in the draw mode. That is, in the draw mode, the information processing system presents the selection probability values of featured characters and non-featured characters to the user. Therefore, even when the selection probabilities of rare characters are changed, the user can check the current selection probability values while in the draw mode. Note that "to present the selection probability values to the user in the draw mode" means that the selection probability values may be presented visually and/or audibly during a part of the draw mode, and the selection probability values do not need to be presented for the entire period of the draw mode.

As described above, in the present embodiment, when a rare character is granted to the user in the draw mode, the information processing system resets (i.e., sets to zero) or decreases the count value. Note that when a rare character is chosen by a draw but the user does not select a selection candidate (i.e., an attribute symbol) corresponding to the rare character, thereby resulting in the rare character being not granted to the user, the selection probabilities of rare characters are maintained (i.e., not changed back to the base values), and the count value is not reset or decreased.

In the present embodiment, after the count value is reset or decreased, when a normal character is granted to the user in the draw mode, the information processing system re-starts counting the count value. Note that in this case, the information processing system re-starts counting the count value starting from the reset or decreased count value. That is, when the information processing system re-starts counting the count value after the count value is decreased, the information processing system adds one to the decreased count value. Therefore, even after a rare character is once granted to the user, and the count value is once reset or decreased, the information processing system counts the count value, thereby boosting the selection probabilities of rare characters. Therefore, according to the present embodiment, even after a rare character is granted to the user, it is possible to motivate the user to continue to play the summon game.

Note that in the present embodiment, the information processing system also counts, as the count value, the number of times a game character is granted through a summon that is performed without consuming summon points (e.g., a summon that is performed in exchange for consuming a ticket described above), as well as the number of times a game character is granted through a summon that is performed in exchange for consuming summon points. Note however that in other embodiments, when a game character is granted through a summon that is performed without consuming summon points, the information processing system may not count the count value.

In the present embodiment, the information processing system manages the count value described above and the selection probabilities of game characters separately for different summon games. Therefore, in the present embodiment, even if the selection probabilities of rare characters boost as the count value increases in a certain summon game, the selection probabilities do not boost in other summon games. This gives a strategic aspect to the selection of a summon game to play, and it is possible to improve the playability of the summon game.

If the count value becomes equal to or greater than a predetermined capping selection count (e.g., 120), the information processing system may change the selection probabilities so that a rare character will certainly be chosen by a draw. Thus, when the count value reaches the capping selection count in an iteration of the draw mode, it is ensured, in the next iteration of the draw mode, that rare characters are chosen by a draw so that the five selection candidates are all those corresponding to rare characters. Therefore, in such a case, the user can certainly obtain a rare character. Thus, even when rare characters are not granted to the user in a summon game, it is possible to motivate the user to continue to play the summon game. Note that in such a case, also when a rare character is granted to the user, the selection probability of the rare character is changed (i.e., lowered) and the count value is reset or decreased.

[3. Specific Example of Process in Information Processing System]

Next, referring to FIG. 8 to FIG. 11, a specific example of information processes in the information processing system will be described.

[3-1. Data Used in Information Processes]

Figure 8:
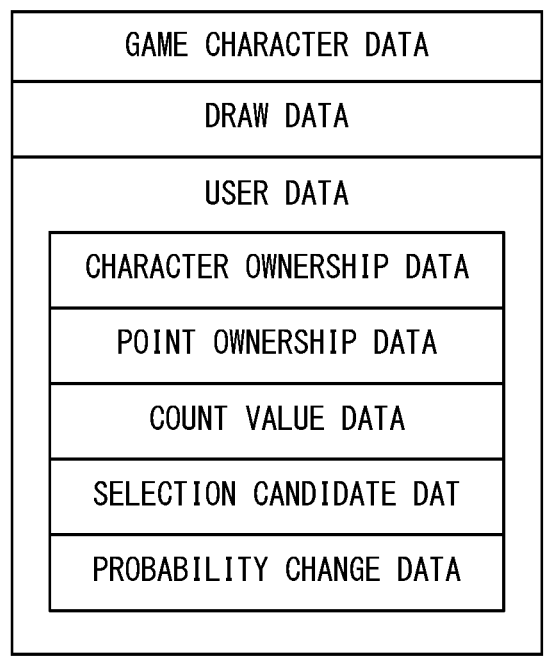
FIG. 8 is a diagram showing an example of various data used in information processes in the non-limiting information processing system.

FIG. 8 is a diagram showing an example of various data used in information processes in the information processing system. The data shown in FIG. 8 are stored in the storage section 12 of the server 1 (or the memory of the processing section 11), for example.

As shown in FIG. 8, the server 1 stores game character data for game characters used in the game. The game character data includes data representing the ability, the attribute, etc., of the game characters.

The server 1 also stores draw data used in the draw described above. The draw data includes selection probability data that represents the selection probability (more specifically, the base value of the selection probability) set for each game character. For example, the selection probability data includes data representing the rarity level of each game character that can be chosen by a draw, data representing the selection probability corresponding to the rarity level (i.e., the selection probability of a game character of that rarity level), and data representing game characters to be featured characters from among rare characters.

As shown in FIG. 8, the server 1 stores user data related to the user of the game application. Although not shown, user data is stored for each user who uses the game application.

The user data includes character ownership data and point ownership data. The character ownership data represents game characters owned by the user in the game application. The point ownership data represents the amount of summon points owned by the user in the game application. Note that in addition to these data, the user data may also include data that represents items owned by the user (e.g., tickets, etc.). The user data may include data that is used in a game other than the summon game in the game application. The user data also includes count value data that represents the count value described above.

The user data includes selection candidate data. The selection candidate data represents selection candidates currently being presented to the user in the draw mode. Specifically, the selection candidate data indicates, for each selection candidate, the attribute indicated by the selection candidate, the game character corresponding to the selection candidate, whether or not the selection candidate has been selected, etc.

The user data includes probability change data. The probability change data indicates whether or not the selection probability of game characters (specifically, rare characters) has been changed, and if so, the change.

Note that other than data shown in FIG. 8, the server 1 stores a server-side game program. The server-side game program is a program used for executing a game process executed on the server 1 (the server-side summon game process shown in FIG. 10). That is, the processing section 11 of the server 1 executes the server-side game program, thereby executing the server-side summon game process (see FIG. 10) to be described below on the server 1.

The terminal apparatus 2 stores a terminal-side game program. The terminal-side game program is a program used for executing a game process executed on the terminal apparatus 2 (the terminal-side summon game process shown in FIG. 9). That is, the processing section 21 of the terminal apparatus 2 executes the terminal-side game program, thereby executing the terminal-side summon game process (see FIG. 9) to be described below on the terminal apparatus 2.

Note that the terminal apparatus 2 may store a part or whole of the various data (see FIG. 8) stored in the server 1 for use in the execution of the terminal-side summon game process. Data used in the information processing system may be stored either in the server 1 or in the terminal apparatus 2. Note that where the same data are stored in the server 1 and in the terminal apparatus 2, the data stored in the server 1 and the data stored in the terminal apparatus 2 are synchronized with each other with appropriate timing.

[3-2. Process in Terminal Apparatus]

Figure 9:
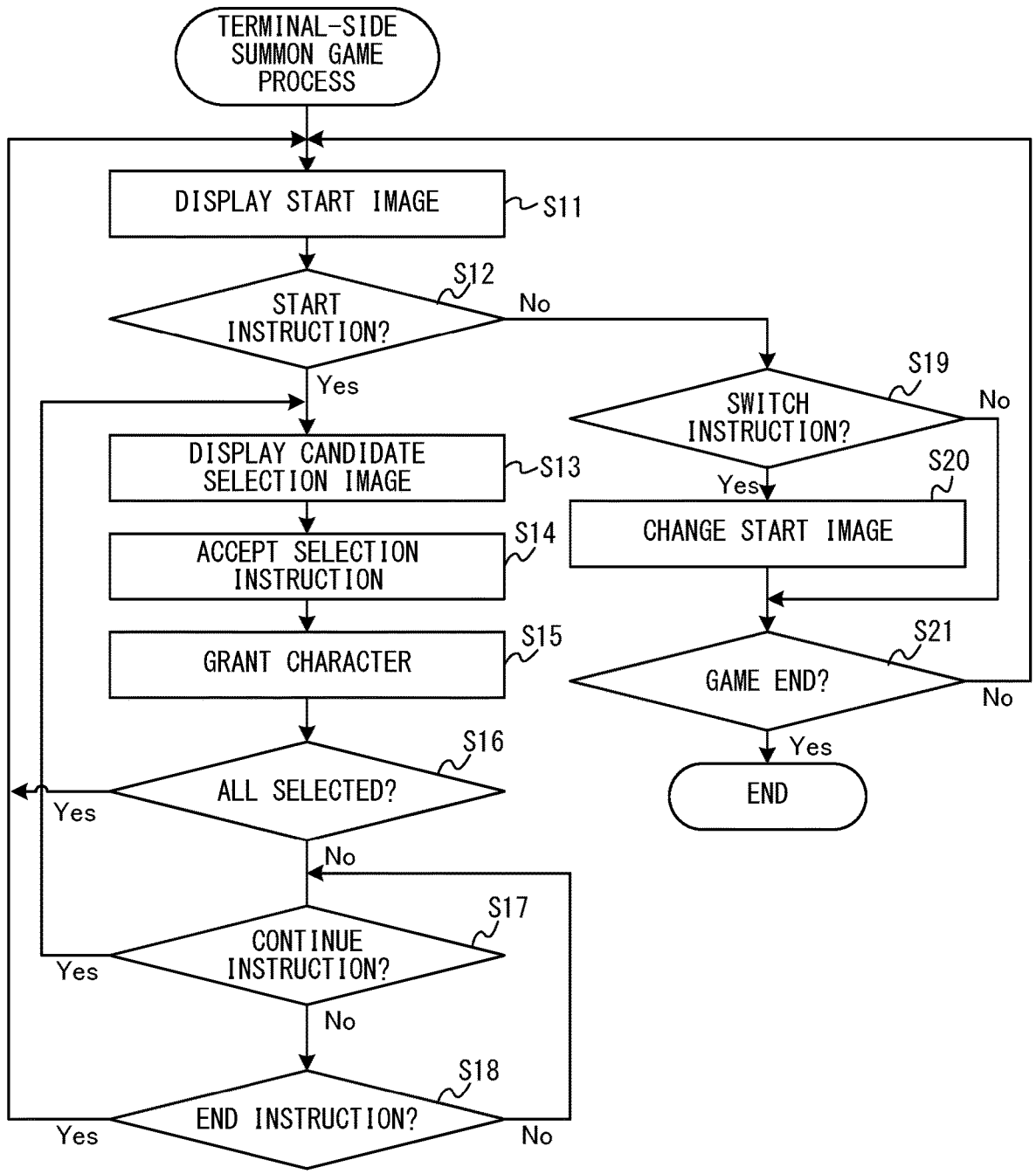
FIG. 9 is a flow chart showing an example of a flow of a terminal-side summon game process executed by a non-limiting terminal apparatus.

FIG. 9 is a flow chart showing an example of the flow of the terminal-side summon game process executed by the terminal apparatus. Note that the terminal-side summon game process shown in FIG. 9 is started in response to the user giving an instruction to start a summon game during the execution of the terminal-side game program stored in the storage section 22.

Figure 10:
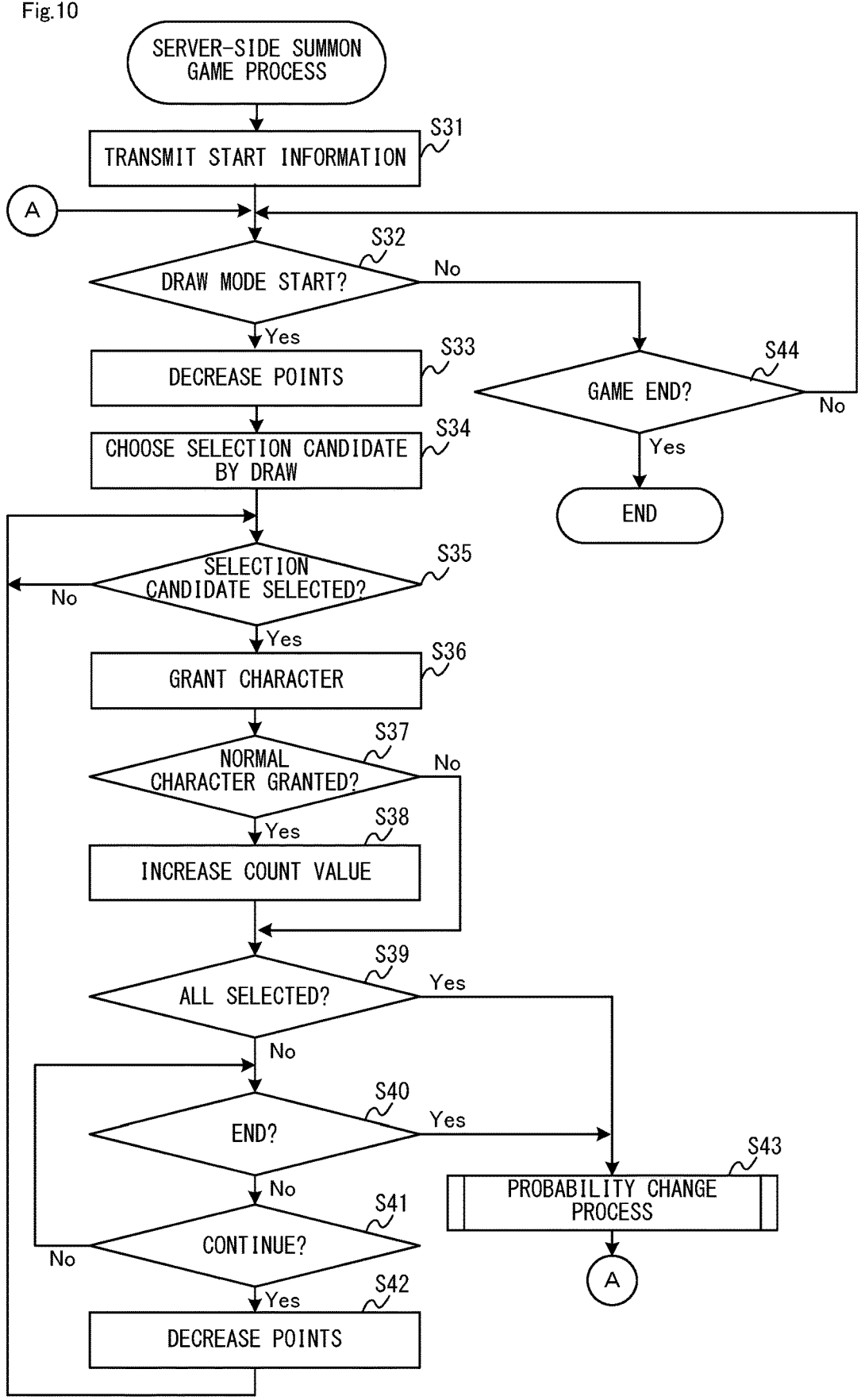
FIG. 10 is a flow chart showing an example of a flow of a server-side summon game process executed by a non-limiting server.
Figure 11:
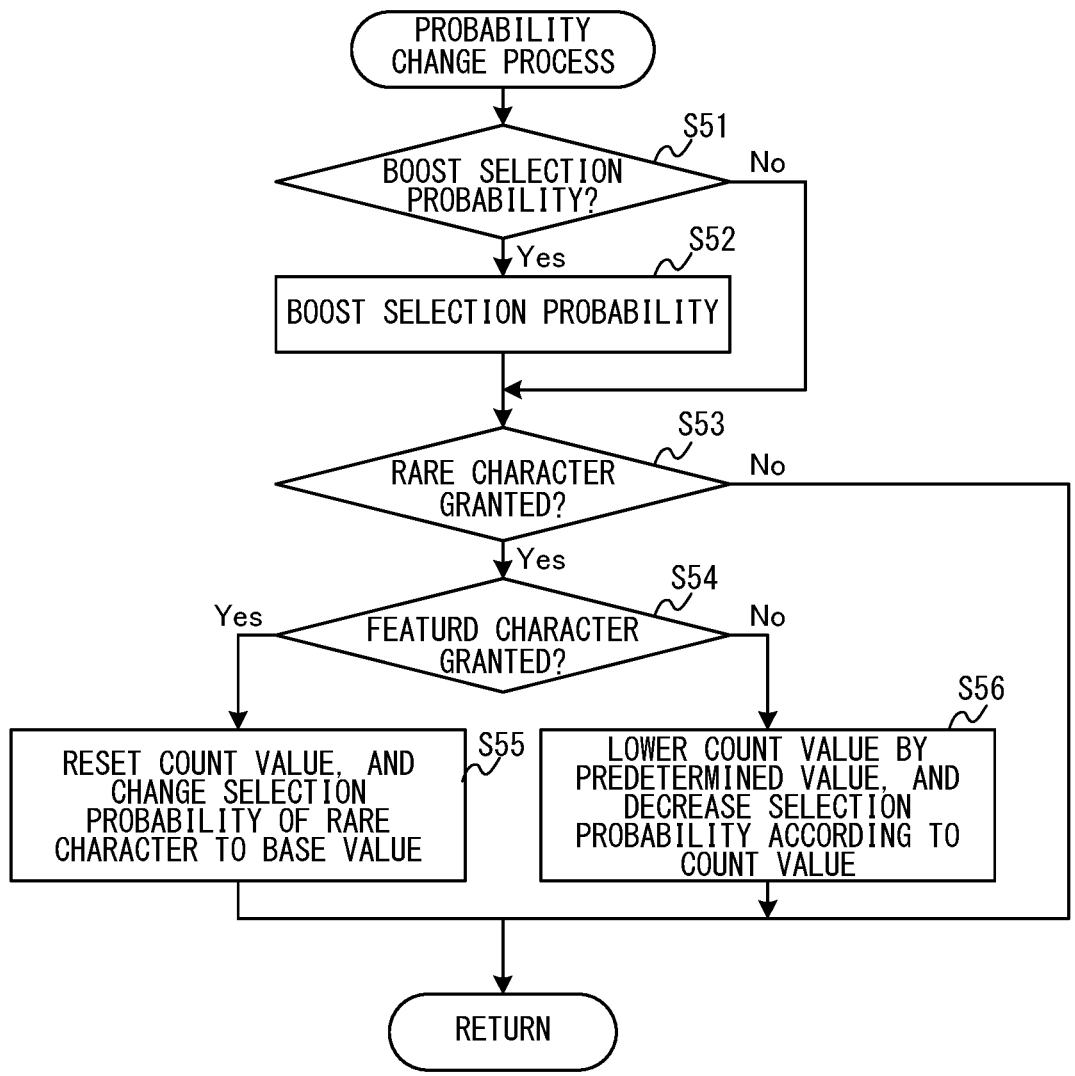
FIG. 11 is a sub-flow chart showing an example of a detailed flow of a probability changing process of step S43 shown in FIG. 10.

Note that in the present embodiment, it is assumed that the CPU (in other words, the processor) of the processing section 11 of the server 1 or the processing section 21 of the terminal apparatus 2 executes the game program stored in the storage section 12 or 22, thereby executing the processes of the steps shown in FIG. 9 to FIG. 11. Note however that in other embodiments, some of the processes of the steps described above may be executed by another processor (e.g., a dedicated circuit, or the like) different from the CPU. Where the terminal apparatus 2 can communicate with the server 1, some of the processes of the steps shown in FIG. 9 may be executed in the server 1. Some of the processes of the steps shown in FIG. 10 and FIG. 11 may be executed in the terminal apparatus 2. The processes of the steps shown in FIG. 9 to FIG. 11 are merely illustrative, and the order of steps to be performed may be switched around or other processes may be executed in addition to (or instead of) the processes of the steps, as long as similar results are obtained.

The processing section 21 of the terminal apparatus 2 executes the processes of the steps shown in FIG. 9 using a memory (or the storage section 22). That is, the CPU of the processing section 21 stores data obtained in the process steps in the memory, and when using the data in subsequent process steps, the CPU reads out and uses the data from the memory. Similarly, the processing section 11 of the server 1 executes the processes of the steps shown in FIG. 10 and FIG. 11 using a memory (or the storage section 12). That is, the CPU of the processing section 11 stores data obtained in the process steps in the memory, and when using the data in subsequent process steps, the CPU reads out and uses the data from the memory.

In the terminal-side summon game process shown in FIG. 9, first, in step S11, the processing section 21 generates the start image (see FIG. 4) and displays the start image on the display section 24. In this process, the processing section 21 uses the communication section 25 to transmits to the server 1 a start notification that indicates that the summon game has been started. Having received the start notification, the server 1 transmits start information used for generating the start image (e.g., information representing the number of points owned by the user and information representing the count value) to the terminal apparatus 2 (step S31 to be described below). The processing section 21 receives the information described above via the communication section 25, and generates the start image using the received information. For example, the processing section 21 displays on the display section 24 the start image that represents a predetermined summon game, from among a plurality of summon games included in the game program. Note that where a plurality of summon games are included in the game program, the summon game that is represented by the start image in step S11 from among the plurality of summon games is arbitrary. As the start image is displayed, the terminal apparatus 2 is in a state where the terminal apparatus 2 accepts the start instruction described above, etc. The process of step S12 is executed, following step S11.

In step S12, based on the data output from the input section 23, the processing section 21 determines whether a start instruction to start the draw mode has been given by the user. If the determination result of step S12 is affirmative, the process of step S13 is executed. On the other hand, if the determination result of step S12 is negative, the process of step S19 to be described below is executed.

In step S13, the processing section 21 starts the draw mode, and generates the candidate selection image described above (see FIG. 5 and FIG. 6) and displays the candidate selection image on the display section 24. Thus, the processing section 21 is in a state where the processing section 21 accepts the selection instruction described above. The series of processes of steps S13 to S18 is executed in the draw mode.

Note that when first generating a candidate selection image (i.e., when generating a candidate selection image including five attribute symbols), the processing section 21 uses the communication section 25 to transmit a draw request for performing a draw to the server 1. Having received the draw request, the server 1 performs a draw to choose five game characters, and transmits selection candidate information representing the selection candidate corresponding to each game character chosen to the terminal apparatus 2 (step S34 to be described below). For example, the selection candidate information includes information representing the attribute of the attribute symbol corresponding to each selection candidate. The selection candidate information may also include information representing the number of points owned at present. The processing section 21 receives the selection candidate information, and generates the candidate selection image based on the received selection candidate information.

When re-generating a candidate selection image in response to a continue instruction given after a selection candidate is selected, the processing section 21 generates a candidate selection image so as to include, instead of the selected attribute symbol, a character image representing a game character that corresponds to the attribute symbol (see FIG. 6). The process of step S14 is executed, following step S13.

In step S14, the processing section 21 receives, from the user, a selection instruction to select one of the selection candidates included in the candidate selection image by using the input section 23. Then, the processing section 21 transmits, to the server 1, selection information that represents a selection candidate selected by the selection instruction. Thus, the selection candidate selected by the user can be recognized also on the server 1 side. The process of step S15 is executed, following step S14.

In step S15, the processing section 21 grants the game character selected by the selection instruction to the user. Here, having received the selection information, the server 1 transmits, to the terminal apparatus 2, granted character information representing the game character corresponding to the selection candidate represented by the selection information (step S36 to be described below). The granted character information includes information for using the game character in the game (e.g., information representing parameters such as abilities of the game character). The processing section 21 receives the granted character information from the server 1, and grants the game character represented by the received granted character information to the user. That is, the processing section 21 realizes a state where the user can use the game character in the game program. In step S15, the processing section 21 displays on the display section 24 a special effects image that shows the game character being summoned to appear. The process of step S16 is executed, following step S15.

In step S16, the processing section 21 determines whether the selection candidates included in the candidate selection image have been all selected. If the determination result of step S16 is negative, the process of step S17 is executed. On the other hand, if the determination result of step S16 is affirmative, the processing section 21 ends the draw mode and executes the process of step S11 again.

In step S17, the processing section 21 determines whether a continue instruction to continue the draw mode has been given by the user based on data output from the input section 23. If the determination result of step S17 is affirmative, the process of step S13 is executed again. On the other hand, if the determination result of step S17 is negative, the process of step S18 is executed.

In step S18, it is determined whether an end instruction to end the draw mode has been given by the user based on data output from the input section 23. If the determination result of step S18 is affirmative, the processing section 21 ends the draw mode and executes the process of step S11 again. On the other hand, if the determination result of step S18 is negative, the process of step S17 is executed again. Thereafter, the processes of steps S17 and S18 are repeatedly executed until a continue instruction or an end instruction is given.

Note that when the continue instruction is given, the processing section 21 uses the communication section 25 to transmit, to the server 1, a continue notification indicating that the draw mode is to be continued. When ending the draw mode, the processing section 21 uses the communication section 25 to transmit, to the server 1, a draw end notification indicating that the draw mode is to be ended. Therefore, whether the draw mode is to be continued or ended can be recognized also on the server 1 side.

On the other hand, in step S19, the processing section 21 determines whether a switch instruction to switch the summon game being selected to another has been given by the user based on data output from the input section 23. If the determination result of step S19 is affirmative, the process of step S20 is executed. On the other hand, if the determination result of step S19 is negative, the process of step S21 is executed, skipping the process of step S20.

In step S20, the processing section 21 changes the content of the start image displayed on the display section 24. That is, the content of the content image 31 and the period image 32 in the start image is changed to content that represents a summon game different from the summon game represented by the start image before the change. The process of step S21 is executed, following step S20.

In step S21, the processing section 21 determines whether or not to end the summon game. Specifically, the processing section 21 determines, based on data output from the input section 23, whether an instruction to end the summon game mode or an instruction to start a game other than the summon game has been given by the user while the start image is being displayed. If the determination result of step S21 is negative, the process of step S11 is executed again. On the other hand, if the determination result of step S21 is affirmative, the processing section 21 ends the terminal-side summon game process shown in FIG. 9. Note that in such a case, the processing section 21 uses the communication section 25 to transmit to the server 1 a game end notification indicating that the summon game is to be ended.

[3-3. Process in Server]

FIG. 10 is a flow chart showing an example of the flow of the server-side summon game process executed by the server 1. Note that the series of processes shown in FIG. 10 is started in response to the terminal apparatus 2 transmitting the start notification indicating that the summon game has been started (step S11) and the server 1 receiving the start notification.

In step S31, the processing section 11 uses the communication section 13 to transmit, to the terminal apparatus 2, the start information used for generating the start image on the terminal apparatus 2. The process of step S32 is executed, following step S31.

In step S32, the processing section 11 determines whether the draw mode has been started on the terminal apparatus 2. Specifically, the processing section 11 determines whether the draw request described above has been received from the terminal apparatus 2 via the communication section 13. If the determination result of step S32 is affirmative, the process of step S33 is executed. On the other hand, if the determination result of step S32 is negative, the process of step S44 to be described below is executed.

In step S33, the processing section 11 decreases the summon points owned by the user by a predetermined amount (here, five). That is, the processing section 11 updates the value represented by the point ownership data stored in the server 1 to a value that is obtained by subtracting five from the value before the update. Note that when the start instruction is given in exchange for consuming a ticket, the processing section 11 updates data that represents the number of tickets owned by the user, instead of updating the point ownership data. The process of step S34 is executed, following step S33.

In step S34, the processing section 11 chooses game characters that are to be selection candidates by drawing game characters. Note that the draw is performed according to the method described in "[2. Outline of process in information processing system]" above. In this process, the processing section 11 determines the selection probability of each game character based on the selection probability data and the probability change data stored in the server 1, and then performs the draw based on the determined selection probability. The processing section 11 uses the communication section 13 to transmit to the terminal apparatus 2 selection candidate information that represents selection candidates (i.e., attribute symbols) corresponding to the chosen game characters. Moreover, the processing section 11 updates the selection candidate data stored in the server 1 so that the selection candidate data represents the new selection candidates, which have been determined by the draw described above. The process of step S35 is executed, following step S34.

In step S35, the processing section 11 determines whether the user has selected one of the selection candidates. Here, as described above, when the terminal apparatus 2 receives a selection instruction from the user that selects one of the selection candidates included in the candidate selection image, the terminal apparatus 2 transmits to the server 1 selection information that represents the selection candidate that is selected by the selection instruction (step S14). The processing section 11 determines whether the user has selected one of the selection candidates based on whether or not the selection information has been received from the terminal apparatus 2 via the communication section 13. If the determination result of step S35 is affirmative, the process of step S36 is executed. On the other hand, if the determination result of step S35 is negative, the process of step S35 is executed again. That is, the server 1 waits until the selection information is received from the terminal apparatus 2.

In step S36, the processing section 11 grants a game character that corresponds to the selected selection candidate to the user. As an example of the granting, the processing section 11 uses the communication section 13 to transmit to the terminal apparatus 2 the granted character information representing a game character that corresponds to the selection candidate represented by the selection information received from the terminal apparatus 2. The processing section 11 updates the character ownership data stored in the server 1 so as to include this game character. This means that the game character has been granted to the user. The processing section 11 updates the selection candidate data stored in the server 1 so that the selected selection candidate is indicated as selected. The process of step S37 is executed, following step S36.

In step S37, the processing section 11 determines whether the game character granted in step S36 described above is a normal character. If the determination result of step S37 is affirmative, the process of step S38 is executed. On the other hand, if the determination result of step S37 is negative, the process of step S40 is executed, skipping the process of step S38.

In step S38, the processing section 11 counts the count value described above. That is, the processing section 11 updates the value represented by the count value data stored in the server 1 to a value that is obtained by adding one to the value before the update. The process of step S39 is executed, following step S38.

In step S39, the processing section 11 determines whether the selection candidates in the current iteration of the draw mode have been all selected by referring to the selection candidate data stored in the server 1. If the determination result of step S39 is negative, the process of step S40 is executed. On the other hand, if the determination result of step S39 is affirmative, the processing section 11 determines that the draw mode has been ended on the terminal apparatus 2 and executes the process of step S43 to be described below.

In step S40, the processing section 11 determines whether or not to end the draw mode. Specifically, the processing section 11 determines whether the draw end notification described above has been received from the terminal apparatus 2 via the communication section 13. If the determination result of step S40 is affirmative, the processing section 11 determines that the draw mode has been ended on the terminal apparatus 2 and executes the process of step S43 to be described below. On the other hand, if the determination result of step S40 is negative, the process of step S41 is executed.

In step S41, the processing section 11 determines whether to continue the draw mode. Specifically, the processing section 11 determines whether the continue notification described above has been received from the terminal apparatus 2 via the communication section 13. If the determination result of step S41 is affirmative, the process of step S42 is executed. On the other hand, if the determination result of step S41 is negative, the process of step S40 is executed again. Thereafter, the processes of steps S40 and S41 are repeatedly executed until it is determined to end or continue the draw mode.

In step S42, the processing section 11 decreases the summon points owned by the user by a predetermined amount. That is, the processing section 11 updates the value represented by the point ownership data stored in the server 1 to a value that is obtained by subtracting the predetermined amount from the value before the update. Note that the predetermined amount is determined based on the number of unselected selection candidates in the current iteration of the draw mode (see "[2. Outline of process in information processing system]" above). The process of step S35 is executed again, following step S42.

On the other hand, in step S43, the processing section 11 executes a probability changing process. The probability changing process is a process of changing selection probabilities of game characters. The detailed flow of the probability changing process will now be described with reference to FIG. 11.

FIG. 11 is a sub-flow chart showing an example of the detailed flow of the probability changing process of step S43 shown in FIG. 10. In the probability changing process, first, in step S51, the processing section 11 determines whether or not to boost the selection probability of rare characters. Specifically, the processing section 11 determines whether the count value represented by the count value data stored in the server 1 has reached the probability boost count described above (including cases where the probability boost count has been exceeded) in the draw mode that is determined to have been ended in step S39 or S40 described above. If the determination result of step S51 is affirmative, the process of step S52 is executed. On the other hand, if the determination result of step S51 is negative, the process of step S53 is executed, skipping the process of step S52.

In step S52, the processing section 11 boosts the selection probability of rare characters. Specifically, the processing section 11 updates the content of the probability change data stored in the server 1 based on the current count value (see FIG. 7). As described above, in the draw process of step S34, the selection probabilities of game characters are set based on the selection probability data and the probability change data stored in the server 1. Therefore, as the selection probability is boosted in the process of step S52, rare characters are more likely to be chosen in the next draw process to be performed. The process of step S53 is executed, following step S52.

In step S53, the processing section 11 determines whether a rare character has been granted to the user in the iteration of the draw mode that is determined to have been ended in step S39 or S40 described above. If the determination result of step S51 is affirmative, the process of step S54 is executed. On the other hand, if the determination result of step S51 is negative, the processing section 11 ends the probability changing process shown in FIG. 11.

In step S54, the processing section 11 determines whether a featured character has been granted to the user in the iteration of the draw mode that is determined to have been ended in step S39 or S40 described above. If the determination result of step S54 is affirmative, the process of step S55 is executed. On the other hand, if the determination result of step S54 is negative, the process of step S56 is executed.

In step S55, the processing section 11 resets the count value and changes the selection probability values of rare characters (i.e., featured characters and non-featured characters) to the respective base values. Specifically, the processing section 11 updates the value represented by the count value data stored in the server 1 to zero. The processing section 11 updates the content of the probability change data stored in the server 1 to content that indicates that the selection probability of rare characters is unchanged (i.e., the selection probability value is the base value). Thus, in the next iteration of the draw process, the base value is used as the selection probability of rare characters. After step S55, the processing section 11 ends the probability changing process shown in FIG. 11.

In step S56, the processing section 11 decreases the count value by a predetermined value (20 in the present embodiment), and lowers the selection probability of rare characters to a value that is determined based on the decreased count value. Specifically, the processing section 11 updates the value represented by the count value data stored in the server 1 so as to indicate the decreased value. The processing section 11 also updates the content of the probability change data stored in the server 1 so as to indicate that the selection probability of rare characters is the decreased value. Therefore, if the decreased count value is equal to or greater than five, in the next iteration of the draw process, a draw is performed with the selection probability of rare characters being higher than the base value. After step S56, the processing section 11 ends the probability changing process shown in FIG. 11.

Referring back to FIG. 10, the process of step S32 is executed, following the probability changing process (step S43).

On the other hand, in step S44, the processing section 11 determines whether or not to end the summon game. Here, when it is determined to end the summon game in step S21 described above, the terminal apparatus 2 transmits to the server 1 the game end notification indicating that the summon game is to be ended. The processing section 11 determines that the summon game is to be ended when the game end notification is received from the terminal apparatus 2 via the communication section 13. If the determination result of step S44 is negative, the process of step S32 is executed again. On the other hand, if the determination result of step S44 is affirmative, the processing section 11 ends the server-side summon game process shown in FIG. 10.

[4. Function/Effect of Present Embodiment and Variations]

As described above, according to the embodiment described above, an information processing system is configured to include the following units:

- a draw execution unit (step S34) configured to execute, in response to an instruction from a user, a draw for choosing one or more characters based on selection probabilities from among character groups, the character groups including a first group including one or more game characters (e.g., featured characters) of which a selection probability is set to a first base value, and a second group including one or more game characters (e.g., non-featured characters) of which a selection probability is set to a second base value;
- a character granting unit (step S36) configured to grant at least one of the characters chosen by the draw to the user;
- a count unit (step S38) configured to count the number of times (e.g., the count value) a game character of a third group (e.g., a normal character), which is not included in the first group or the second group, has been granted to the user by the draw;
- a probability boost unit (step S52) configured to, when the count increases to satisfy a boost condition, boost a first selection probability value, which is a selection probability of game characters included in the first group, and a second selection probability value, which is a selection probability of game characters included in the second group;
- a first probability changing unit (step S55) configured to, when a game character included in the first group has been granted to the user by the draw, change the first selection probability value, which has been boosted, to the first base value, and change the second selection probability value, which has been boosted, to the second base value; and
- a second probability changing unit (step S56) configured to, when a game character included in the second group has been granted to the user by the draw and a boost value of the first selection probability is greater than a predetermined value, at least lower the first selection probability value, which has been boosted, so that the first selection probability value is greater than the first base value.

With the configuration described above, when a game character included in the second group is granted to the user by a draw, the selection probability of game characters included in the first group may be set higher than the selection probability of game characters included in the second group. It is possible to motivate the user to continue to play the draw. Thus, it is possible to improve the playability of the draw.

Note that the above phrase "at least lower the first selection probability value, which has been boosted, so that the first selection probability value is greater than the first base value" means to include embodiments as follows.

An embodiment where the first selection probability and the second selection probability are both lowered as in the embodiment described above.

An embodiment where the first selection probability is lowered so as to be greater than the first base value while not lowering the second selection probability.

In other embodiments, when a game character included in the second group has been granted to the user by a draw and the boost value of the first selection probability is greater than a predetermined value, the information processing system may lower the second selection probability while not lowering the first selection probability. Also in such a case, it is possible to make the first selection probability greater than the base value.

In the embodiment described above, the first base value and the second base value (i.e., the base values of the selection probabilities of featured characters and non-featured characters) are lower than the selection probability value that is set for game characters of the third group (i.e., normal characters). It is believed that many users would wish a rare character be granted by a draw, and it is therefore possible, with the configuration described above, to motivate many users to continue to play the draw.

In the embodiment described above, a featured character is a game character newly added as a game character that can be granted in a summon game or a game character that can be obtained only in a summon game that can be played only for a limited time from among a plurality of summon games. That is, a featured character can be said to be a game character that is not chosen by a draw in a period in which a non-featured character is chosen by a draw. That is, in the embodiment described above, the information processing system performs a draw in the first period, wherein featured characters and non-featured characters are objects of the draw, and performs a draw in the second period, which is different from the first period, wherein non-featured characters are objects of the draw and featured characters are not objects of the draw. It is believed that many users wish a featured character be granted by a draw in the first period, and it is therefore possible, with the configuration described above, to motivate many users to continue to play the draw.

Note that in the embodiment described above, the first base value is equal to the second base value. Here, in other embodiments, the first base value and the second base value may be different from each other. For example, the first base value may be smaller than or greater than the second base value.

Note that in the embodiment described above, the information processing system chooses a plurality of game characters by a draw, presents to the user a plurality of candidate images (specifically, attribute symbols) corresponding to the game characters chosen by a draw, and accepts at least one selection instruction to select one candidate image from among the plurality of candidate images. Then, a game character that corresponds to the candidate image selected by the user in the draw mode is granted to the user. As described above, in the embodiment described above, game characters chosen by a draw are presented as selection candidates, and some (or all) of the selection candidates are granted to the user. Here, in other embodiments, the information processing system may grant game characters chosen by a draw to the user without presenting the game characters as candidates. For example, the information processing system may choose one or more game characters by a draw, and grant all the chosen game characters to the user.

Note that in the embodiment described above, the candidate images (specifically, attribute symbols) represent types of characters corresponding to the candidate images and are images with which the characters cannot be identified uniquely (FIG. 5). This gives a strategic aspect to the selection of candidate images, and it is possible to improve the playability of the draw.

In the embodiment described above, in the draw mode, the information processing system accepts a selection instruction at least on the condition that the points owned by the user be decreased. The information processing system sets the number of points (e.g., four) that are required for giving a selection instruction when the number of selectable candidate images is equal to a first number (e.g., when there are two to four attribute symbols) to be smaller than the number of points (e.g., five) that are required for giving a selection instruction when the number of selectable candidate images is equal to a second number that is greater than the first number (e.g., when there are five attribute symbols). This gives a strategic aspect to the selection of whether to continue to select candidate images in the draw mode or to end the draw mode, and it is possible to improve the playability of the draw.

In other embodiments, as a draw for choosing game characters, the information processing system may execute a first draw for choosing attributes and a second draw for choosing game characters. For example, in other embodiments, at the start of the draw mode, the information processing system may execute, as the first draw, the process of choosing one of four attributes for a number of times that is equal to the initial candidate count. In the draw mode, a number of chosen attribute symbols, equal to the initial candidate count, are presented to the user. When the user selects an attribute symbol in the draw mode, the information processing system may choose by a draw one of the game characters of the attribute represented by the selected attribute symbol as the second draw, so as to grant the chosen game character to the user. Note that in such a case, changing the selection probabilities to be used in the second draw may be performed after completion of the draw mode as in the embodiment described above, or may be performed during the draw mode.

Note that in other embodiments, the information processing system does not need to include some of the components of the embodiment described above and does not need to execute some of the processes that are executed in the embodiment described above. For example, in order to realize a specific one of the advantageous effects of the embodiment described above, the information processing system may include a component or components for realizing the specific advantageous effect and execute a process or processes for realizing the specific advantageous effect, and the information processing system does not need to include other components and does not need to execute other processes.

The embodiment described above is applicable to game systems and game programs, for example, with the aim of improving the playability of a draw for granting a game character.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system comprising:
a processor and a memory coupled thereto, the processor being configured to control the information processing system to at least:
execute, in response to an instruction from a user, a draw process for choosing a plurality of game characters, including at least a first game character, in one iteration of the draw process, the plurality of game characters included among a plurality of game character groups, the plurality of game character groups including a first group including one or more game characters of which are each associated with a selection probability that is set to a first base value, and a second group including one or more game characters of which associated with a selection probability is set to a second base value;
display, as part of a draw mode graphical user interface, a plurality of candidate images corresponding to the plurality of game characters chosen by the one iteration of the draw process, wherein each respective one of the plurality of candidate images includes a corresponding representation of an attribute of the game character that is associated with the respective one of the plurality of candidate images;
while the plurality of candidate images are displayed, accept, as part of the one iteration of the draw process, multiple selection instructions to select multiple ones of the candidate images;
grant, for each selected candidate image, the corresponding one of the plurality of game characters that has been selected by the user;
track a boost value that is associated with a number of times that a game character of a third group, which is not included in the first group or the second group, has been granted to the user via the draw process;
based on the boost value being determined to satisfy a boost condition:
(a) boost the selection probability for those game characters that are included in the first group to a first selection probability value, and
(b) boost the selection probability for those game characters included in the second group to a second selection probability value, wherein boost of the selection probability for those game characters in the first and second groups is performed only after completion of the one iteration of the draw process;
based on granting of the first game character to the user via the draw process and when the first game character is included in the first group:
(a) change the selection probability for those game characters included in the first group, which had been boosted to the first selection probability value, to the first base value, and
(b) change the selection probability for those game characters included in the second group, which has been boosted to the second selection probability value, to the second base value; and
based on granting of the first game character to the user via the draw process and when the first game character is included in the second group and the boost value is greater than a predetermined value:
lower the selection probability for those game characters included in the first group, which had been boosted, to a value that is greater than the first base value.

2. The information processing system according to claim 1, the processor being configured to further control the information processing system to at least:

when a game character included in the first group is granted to the user by the draw process, reset the boost value to zero; and when a game character included in the second group is granted to the user by the draw process and the boost value is greater than a predetermined count, decrease the boost value so that the decreased boost value is equal to or greater than one, wherein the selection probability for those game characters that are included in the first group and the selection probability for those game characters that are included in the second group are each determined uniquely based on the boost value.

3. The information processing system according to claim 2, wherein when the game character of the third group is granted to the user by the draw process after the boost value is reset or decreased, the information processing system re-starts increasing the boost value from the reset or decreased boost value.

4. The information processing system according to claim 1, wherein the processor is further configured to control the information processing system to at least:

based on granting of a game character of the second group and the boost value being less than the predetermined value:
 (a) change the selection probability for those game characters included in the first group, which had been boosted, to the first base value, and
 (b) change the selection probability for those game characters included in the second group, which has been boosted, to the second base value.

5. The information processing system according to claim 1, wherein a first selection probability value, which is a probability value that one of the game characters in the first group will be selected, and a second selection probability value, which is a probability value that one of the game characters in the first group will be selected, are displayed in the draw mode graphical user interface.

6. The information processing system according to claim 1, wherein each of the plurality of candidate images represent types of game characters corresponding to the candidate images and are images with which the corresponding game character cannot be identified uniquely.

7. The information processing system according to claim 1, wherein the processor is further configured to control the information processing system to at least:

accept a selection instruction at least on a condition that points associated with the user be decreased, wherein a number of points by which the points associated with the user is decreased is based on whether the number of selectable candidate images is equal to a first number or equal to a second number larger than the first number, wherein the number of points is smaller when the number of selectable candidate images is equal to the first number.

8. The information processing system according to claim 1, wherein the first base value and the second base value are lower than the selection probability for at least the game character of the third group.

9. The information processing system according to claim 1, wherein game characters of the first group and game characters of the second group are objects of the draw process in an iteration of the draw process performed in a first period, and game characters of the first group are not objects of the draw process and game characters of the second group are objects of the draw process in an iteration of the draw process performed in a second period different from the first period.

10. An information processing apparatus comprising:

a processor and a memory coupled thereto, the processor being configured to control the information processing system to at least:

execute, in response to an instruction from a user, a draw process for choosing a plurality of game characters, including at least a first game character, in one iteration of the draw process, the plurality of game characters included among a plurality of game character groups, the plurality of game character groups including a first group including one or more game characters of which are each associated with a selection probability that is set to a first base value, and a second group including one or more game characters of which associated with a selection probability is set to a second base value;

display, as part of a draw mode graphical user interface, a plurality of candidate images corresponding to the plurality of game characters chosen by the one iteration of the draw process, wherein each respective one of the plurality of candidate images includes a corresponding representation of an attribute of the game character that is associated with the respective one of the plurality of candidate images;

while the plurality of candidate images are displayed, accept, as part of the one iteration of the draw process, multiple selection instructions to select multiple ones of the candidate images;

grant, for each selected candidate image, the corresponding one of the plurality of game characters that has been selected by the user;

track a boost value that is associated with a number of times that a game character of a third group, which is not included in the first group or the second group, has been granted to the user via the draw process;

based on the boost value being determined to satisfy a boost condition:
 (a) boost the selection probability for those game characters that are included in the first group to a first selection probability value, and
 (b) boost the selection probability for those game characters included in the second group to a second selection probability value, wherein boost of the selection probability for those game characters in the first and second groups is performed only after completion of the one iteration of the draw process;

based on granting of the first game character to the user via the draw process and when the first game character is included in the first group:
 (a) change the selection probability for those game characters included in the first group, which had been boosted to the first selection probability value, to the first base value, and
 (b) change the selection probability for those game characters included in the second group, which has been boosted to the second selection probability value, to the second base value; and based on granting of the first game character to the user via the draw process and when the first game character is included in the second group and the boost value is greater than a predetermined value:

lower the selection probability for those game characters included in the first group, which had been boosted, to a value that is greater than the first base value.

11. A non-transitory computer-readable storage medium having stored therein instructions that, when executed by a processor of an information processing apparatus, cause the information processing apparatus to perform operations comprising:
executing, in response to an instruction from a user, a draw process for choosing a plurality of game characters, including at least a first game character, in one iteration of the draw process, the plurality of game characters included among a plurality of game character groups, the plurality of game character groups including a first group including one or more game characters of which are each associated with a selection probability that is set to a first base value, and a second group including one or more game characters of which associated with a selection probability is set to a second base value;
displaying, as part of a draw mode graphical user interface, a plurality of candidate images corresponding to the plurality of game characters chosen by the one iteration of the draw process, wherein each respective one of the plurality of candidate images includes a corresponding representation of an attribute of the game character that is associated with the respective one of the plurality of candidate images;
while the plurality of candidate images are displayed, accepting, as part of the one iteration of the draw process, multiple selection instructions to select multiple ones of the candidate images;
granting, for each selected candidate image, the corresponding one of the plurality of game characters that has been selected by the user;
tracking a boost value that is associated with a number of times that a game character of a third group, which is not included in the first group or the second group, has been granted to the user via the draw process;
based on the boost value being determined to satisfy a boost condition:
(a) boosting the selection probability for those game characters that are included in the first group to a first selection probability value, and
(b) boosting the selection probability for those game characters included in the second group to a second selection probability value, wherein boost of the selection probability for those game characters in the first and second groups is performed only after completion of the one iteration of the draw process;
based on granting of the first game character to the user via the draw process and when the first game character is included in the first group:
(a) changing the selection probability for those game characters included in the first group, which had been boosted to the first selection probability value, to the first base value, and
(b) changing the selection probability for those game characters included in the second group, which has been boosted to the second selection probability value, to the second base value; and
based on granting of the first game character to the user via the draw process and when the first game character is included in the second group and the boost value is greater than a predetermined value, lowering the selection probability for those game characters included in the first group, which had been boosted, to a value that is greater than the first base value.

12. An information processing method to be executed by an information processing system, the method comprising:
executing, in response to an instruction from a user, a draw process for choosing a plurality of game characters, including at least a first game character, in one iteration of the draw process, the plurality of game characters included among a plurality of game character groups, the plurality of game character groups including a first group including one or more game characters of which are each associated with a selection probability that is set to a first base value, and a second group including one or more game characters of which associated with a selection probability is set to a second base value;
displaying, as part of a draw mode graphical user interface, a plurality of candidate images corresponding to the plurality of game characters chosen by the one iteration of the draw process, wherein each respective one of the plurality of candidate images includes a corresponding representation of an attribute of the game character that is associated with the respective one of the plurality of candidate images;
while the plurality of candidate images are displayed, accepting, as part of the one iteration of the draw process, multiple selection instructions to select multiple ones of the candidate images;
granting, for each selected candidate image, the corresponding one of the plurality of game characters that has been selected by the user;
tracking a boost value that is associated with a number of times that a game character of a third group, which is not included in the first group or the second group, has been granted to the user via the draw process;
based on the boost value being determined to satisfy a boost condition:
(a) boosting the selection probability for those game characters that are included in the first group to a first selection probability value, and
(b) boosting the selection probability for those game characters included in the second group to a second selection probability value, wherein boost of the selection probability for those game characters in the first and second groups is performed only after completion of the one iteration of the draw process;
based on granting of the first game character to the user via the draw process and when the first game character is included in the first group:
(a) changing the selection probability for those game characters included in the first group, which had been boosted to the first selection probability value, to the first base value, and
(b) changing the selection probability for those game characters included in the second group, which has been boosted to the second selection probability value, to the second base value; and
based on granting of the first game character to the user via the draw process and when the first game character is included in the second group and the boost value is greater than a predetermined value, lowering the selection probability for those game characters included in the first group, which had been boosted, to a value that is greater than the first base value.

* * * * *